United States Patent [19]

Kawasaki et al.

[11] Patent Number: 5,355,192
[45] Date of Patent: Oct. 11, 1994

[54] AUTOMATIC FOCUSING APPARATUS

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 110,834

[22] Filed: Aug. 24, 1993

Related U.S. Application Data

[63] Continuation of Ser. No. 748,786, Aug. 22, 1991, abandoned.

[30] Foreign Application Priority Data

Sep. 14, 1990 [JP] Japan .................................. 2-244485

[51] Int. Cl.$^5$ .......................... G03B 3/00; G03B 17/00
[52] U.S. Cl. ...................................... 354/403; 354/286
[58] Field of Search ............... 354/402, 403, 286, 412, 354/195.1

[56] References Cited

U.S. PATENT DOCUMENTS

| | | | |
|---|---|---|---|
| 4,477,164 | 10/1984 | Nakai et al. ............................ | 354/412 |
| 4,504,135 | 3/1985 | Kawabata ............................. | 354/402 |
| 4,509,842 | 4/1985 | Taniguchi et al. ................... | 354/402 |
| 4,560,267 | 12/1985 | Nakai et al. ............................ | 354/412 |
| 4,602,861 | 7/1986 | Taniguchi et al. ................... | 354/403 |
| 4,673,275 | 6/1967 | Nakai et al. ............................ | 354/412 |
| 4,818,865 | 4/1989 | Matsui et al. ..................... | 354/403 X |
| 4,835,561 | 5/1989 | Matsui ................................... | 354/403 |
| 4,841,322 | 6/1989 | Kawasaki et al. ..................... | 354/400 |
| 4,900,911 | 2/1990 | Matsui et al. ..................... | 354/403 X |
| 4,901,101 | 2/1990 | Ishida et al. ............................ | 354/403 |
| 4,945,376 | 7/1990 | Kawasaki et al. ................... | 354/400 |
| 5,066,969 | 11/1991 | Kawasaki ............................. | 354/402 |
| 5,138,358 | 8/1992 | Aoyama et al. ..................... | 354/403 |
| 5,166,717 | 11/1992 | Kawasaki et al. ............... | 354/286 X |
| 5,170,200 | 12/1992 | Kawasaki et al. ................... | 354/400 |
| 5,181,061 | 1/1993 | Kawasaki et al. ............... | 354/195.1 |
| 5,182,591 | 1/1993 | Kawasaki et al. ............... | 354/484 X |
| 5,223,877 | 6/1993 | Kawasaki et al. ..................... | 354/286 |
| 5,255,043 | 10/1993 | Kawasaki ....................... | 354/286 X |
| 5,255,046 | 10/1993 | Kawasaki et al. ............... | 354/195.1 |

*Primary Examiner*—Michael L. Gellner
*Assistant Examiner*—Jae N. Noh
*Attorney, Agent, or Firm*—Sandler, Greenblum & Bernstein

[57] ABSTRACT

An automatic focusing camera including a camera body and a photographing lens detachably mounted to the camera body. The camera body includes a focus detecting device which outputs a focus signal in accordance with an image formed by a photographing lens, an auxiliary light emitter for emitting auxiliary light for detecting the focus, and an arithmetic operating device for calculating data on focus in accordance with the focus signal output from the focus detecting device, The photographing lens includes a memory for storing predetermined lens data, and an outputting device for outputting the lens data to the camera body. The memory stores correction data on the focusing condition when the auxiliary light is emitted from the auxiliary light emitter. The arithmetic operating device calculates the data on the focusing condition in accordance with the detection data of the focus detecting device and the correction data input from the photographing lens.

25 Claims, 15 Drawing Sheets

AUTOMATIC FOCUSING APPARATUS

This application is a continuation, of application Ser. No. 07/748,786, filed Aug. 22, 1991, now abandoned.

BACKGROUND OF THE INVENTION

1. Field of the Invention

The present invention relates to an automatic focusing apparatus of a camera, and more precisely, it relates to an automatic focusing apparatus in an automatic focusing single lens reflex camera having an auxiliary light emitting device.

2. Description of Related Art

In recent single lens reflex cameras, automatic focusing devices are usually provided. Frequently, a TTL phase difference detection type of focus detecting means is provided in a single lens reflex camera to detect a focus thereof. The TTL phase difference detection type of focus detecting device calculates a deviation (amount of defocus) of an image plane from a film plane due to the phase difference between the two divided images of an object to be taken formed by a taking lens (photographing lens). The necesssary displacement of the focusing lens within the taking lens is calculated in accordance with the calculated amount of defocus so that the focusing lens is moved to the focal point through the calculated displacement by a focusing motor.

The relationship between the amount of defocus and the displacement of the focusing lens depends on the taking lens. To this end, in a conventional single lens reflex camera, the taking lens (interchangeable lens) is provided with a memory means (e.g. ROM) in which lens data peculiar to the taking lens, such as data (which will be referred to as K value data) relating to displacement of the focusing lens corresponding to the unit defocus amount. A microcomputer provided in the camera body has a data communication function in which the lens data stored in the ROM of the taking lens is read.

Recently, taking lenses in automatic focusing (AF) single lens reflex cameras have used a zoom lens in which the K value data varies in accordance with the focal length f thereof. To this end, a focal length detecting means provided on the zoom lens to detect the present focal length, and the K value data corresponding to the focal lengths is stored in the lens ROM.

However, control of the focal length detecting means and retrieval of the K value data must be carried out by the microcomputer of the camera body (body microcomputer). This increases the communication time and unduly loads the body microcomputer.

Furthermore, it is also known to emit a striped pattern of auxiliary infrared light onto the object to be taken in order to make it possible to control the automatic focusing even at a small luminance or low contrast. The body microcomputer calculates the necessary displacement of the focusing lens, based on the amount of defocus in accordance with the image formed by the auxiliary infrared light.

However, the focal length f of the taking lens varies in accordance with the wavelength of light. Accordingly, upon emitting the auxiliary infrared light, if the focusing lens is moved by a displacement corresponding to the same amount of defocus as that obtained when natural light (reference light) is used, the object could be out of focus. To move the focus lens to the correct position when the auxiliary light is used, it is necessary to adjust the amount of defocus in accordance with adjustment data, such as a shift of image plane by the auxiliary light relative to the image plane by the reference light.

However, if all adjustment data corresponding to a plurality of focal lengths is stored in the lens ROM in a known page-memory system, it is necessary to use a large capacity lens ROM, resulting in an increased load on the body microcomputer and increased operation time.

SUMMARY OF THE INVENTION

The primary object of the present invention is to provide an automatic focusing apparatus for a camera in which precise focusing can be effected even when auxiliary light is emitted, and wherein the operation load and operation time of the body microcomputer can be reduced.

To achieve the object mentioned above, according to the present invention, there is provided an automatic focusing camera comprising a camera body and a taking lens which is detachably mounted to the camera body, wherein the camera body includes a focus detecting means which outputs a focus signal in accordance with the image formed by the taking lens, an auxiliary light emitting means for emitting auxiliary light for detecting focus, and an arithmetic operating means for calculating focus data in accordance with the focus signal output from the focus detecting means. The taking lens includes a memory means for storing predetermined lens data, and an outputting means for outputting the lens data to the camera body. The memory means stores correction data on the focusing condition when the auxiliary light is emitted from the auxiliary light emitting means, and the arithmetic operating means of the camera body calculates the focusing condition data in accordance with the detection data of the focus detecting means and the correction data input from the taking lens.

With this arrangement, since when the auxiliary light is emitted the focus is adjusted in accordance with the detection data by the auxiliary light and the correction data thereof, a precise focus adjustment is carried out.

According to another aspect of the present invention, there is provided a taking lens detachably attached to a camera body including a focus detecting means which outputs a focus signal in accordance with an image formed by the taking lens, an auxiliary light emitting means for emitting auxiliary light to detect the focus, and an arithmetic operating means for calculating data on focus in accordance with the focus signal output from the focus detecting means. The taking lens includes a memory means for storing predetermined lens data, and an outputting means for outputting the lens data to the camera body. The memory means stores correction data on the focusing condition when the auxiliary light is emitted from the auxiliary light emitting means.

According to still another aspect of the present invention, there is provided an automatic focusing camera having a camera body and a taking lens which is detachably mounted to the camera body. The camera body includes a TTL focus detecting means, an auxiliary light emitting means for emitting auxiliary light for detecting the focus, and a focus driving means for driving the focus adjusting mechanism of the taking lens. The taking lens includes a focus adjusting means driven by the focus driving means, a focal length varying means, a focal length detecting means, and a lens data storing means for storing lens data transferred to the camera body. The taking lens is further provided with a control means for calculating focus correction data in accordance with the auxiliary light when the auxiliary light emitting means emits the auxiliary light, and focus correction data is stored in the lens data storing means as one of the lens data. The camera body is provided with a control means for driving the focus driving means in accordance with the focus data detected by the TTL focus detecting means and the lens data transferred from the storing means of the taking lens.

The present disclosure relates to subject matter contained in Japanese patent application No. 02-244485 (filed on Sep. 14, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
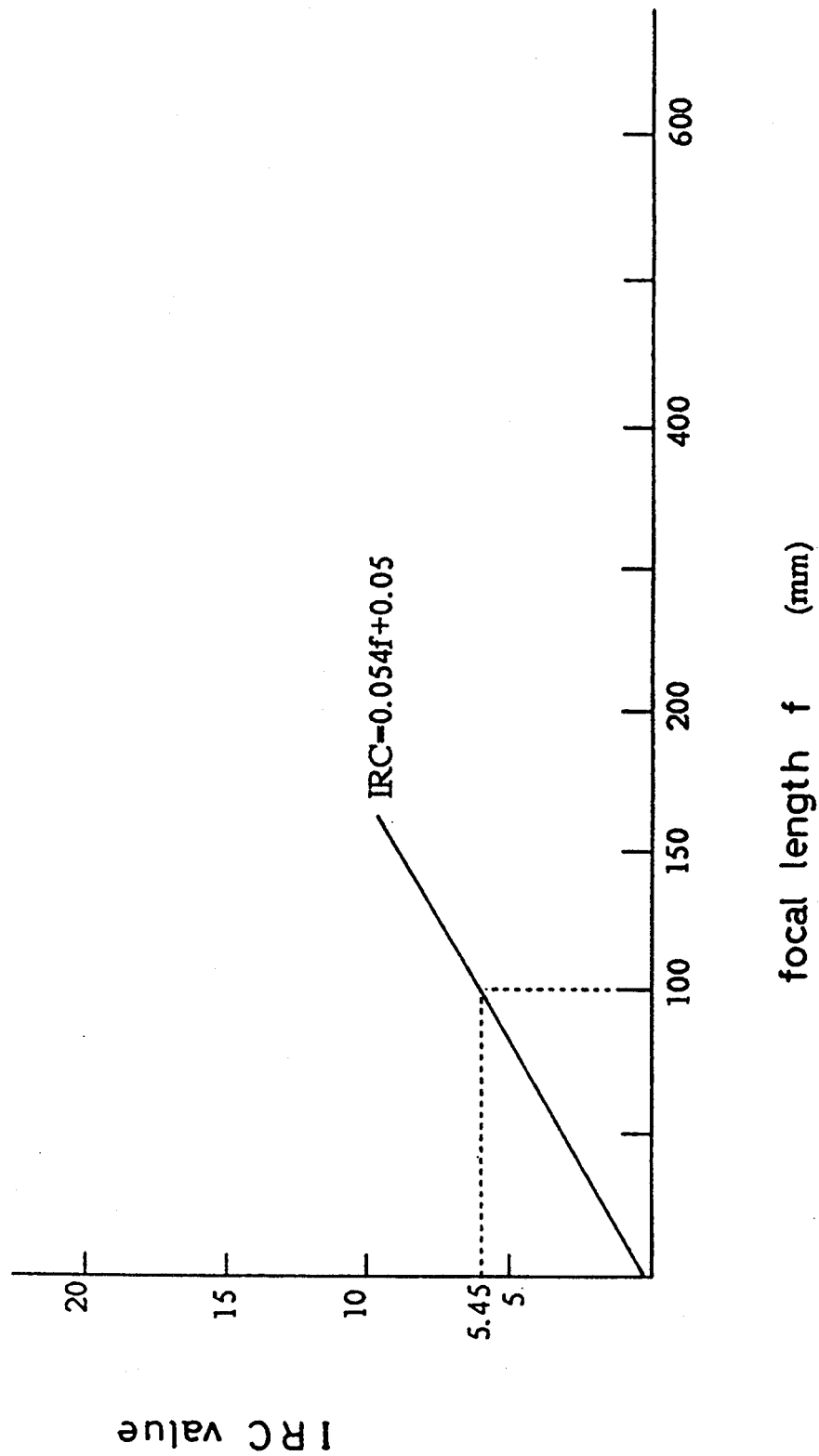
FIGS. 1 and 2 are diagrams showing the relationship between the focal length of a taking lens by reference light and a focal length thereof by infrared light.

FIG. 1 is a diagram showing the deviation between focal lengths by reference light and focal lengths by infrared light (auxiliary light) in a single focal length lens. In FIG. 1, the abscissa represents the focal length $f$ and the ordinate represents the deviation (IRC value) of the focal plane by the auxiliary infrared light with respect to the focal plane by the reference light (wavelength is 660 nm).

As can be seen from FIG. 1, the IRC value ($\mu$m) is approximately obtained from the following equation ①.

$$IRC \approx 0.054 f + 0.05 \quad \text{①}$$

Figure 2:
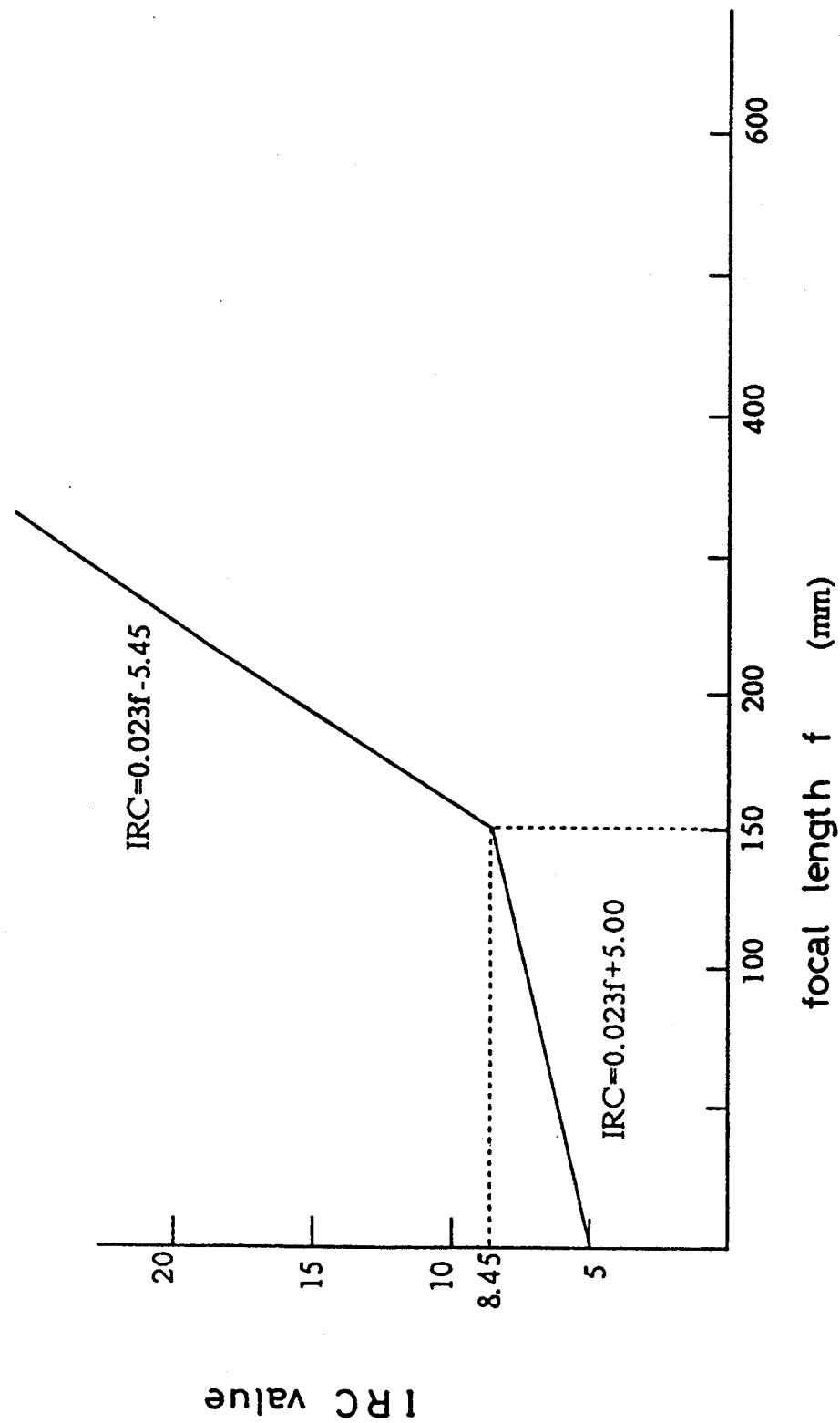

FIG. 2 is a diagram showing the relationship between focal lengths by reference light and those by auxiliary infrared light. As can be seen from FIG. 2, the IRC value is approximated by equations ② and ③ below.

$$IRC \approx 0.023 f + 5 \quad (f < 150) \quad \text{②}$$

$$IRC \approx 0.093 f - 5.45 \quad (f \geq 150) \quad \text{③}$$

In the automatic focusing apparatus of the present invention, the following operations are carried out, using the above mentioned equations ①, ② and ③ when the auxiliary infrared light is emitted.

The control means of the taking lens (lens controller) calculates the focus correction data (IRC data) when the auxiliary infrared light is emitted, using the equations ①, ② and ③. The calculated data is output to the control means of the camera body (body controller).

The body controller calculates a predetermined amount of defocus which is adjusted in accordance with the IRC data input thereto to move the focusing lens by a predetermined displacement.

As a result, a precise focusing is also performed upon emission of auxiliary light.

The above discussion has been directed to characteristics of a single focal length lens and a zoom lens by way of example. Note that the equations mentioned above for calculating the IRC value depend on the lens.

Figure 3:
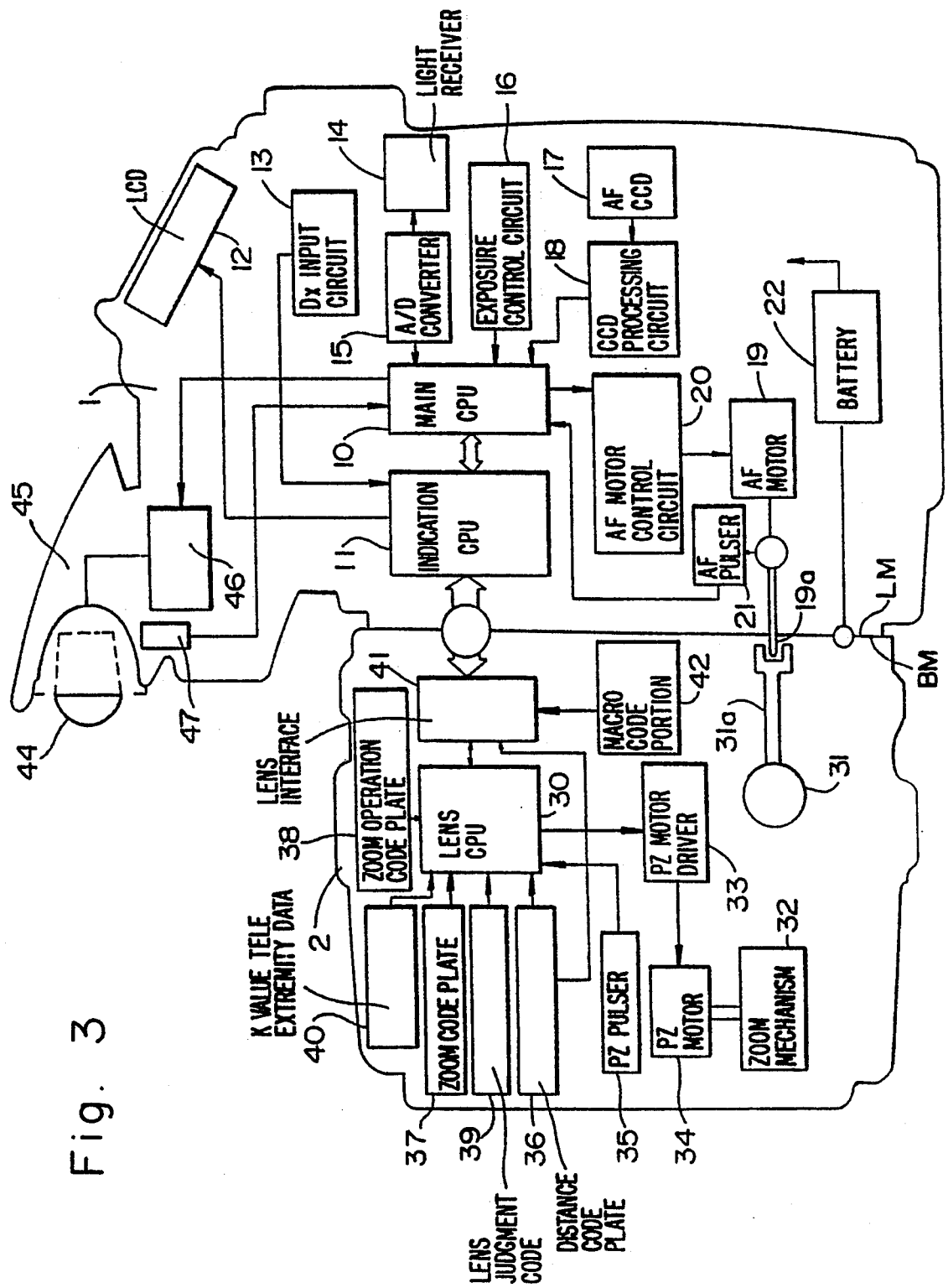
FIG. 3 is a block diagram of a camera system to which the present invention is applied.

FIG. 3 shows a camera system having an automatic focusing device according to the present invention, including the IRC data calculating function and the correction function based on the IRC data, as mentioned above. The camera system is a single lens reflex camera having a camera body 1 and a zoom lens (taking lens) 2 attached thereto.

The camera body 1 has a main CPU 10 which mainly functions as a calculating and control means and an indication CPU 11 which mainly functions as a control, input and output, and transfer means. The main CPU 10 generally controls the whole camera system and performs arithmetic operations on various data necessary for taking a picture. The indication CPU 11 has a data inputting function through switching members, an interface function for transmitting and receiving data (signals) to and from the zoom lens 2, and a control function for controlling the indication of the photographing data.

The indication CPU 11 is connected to an LCD panel 12 which indicates photographing data and a DX code input circuit 13 which reads at least ISO sensitivity data of a film from DX codes provided on a surface of a patrone of the film. A light receiver 14 which receives light incident thereon through the zoom lens 2 to output analog signals corresponding to the amount of light received is connected to the main CPU 10 through an A/D converter 15.

The main CPU 10 is also connected to an exposure control circuit 16 which drives and controls a shutter mechanism (not shown) and a diaphragm mechanism (not shown), etc., in accordance with the input photographing data, a CCD processing circuit 18 which detects the focus state of the zoom lens 2 in response to focus data of an object to be taken, output from an automatic focusing CCD object distance measuring sensor 17, an AF motor control circuit 20 which controls the drive of an AF motor 19 which drives a focusing mechanism (focus adjustment mechanism) 31 of the zoom lens 2, and an AF pulser 21 which detects the amount of rotation (angular displacement or number of revolution) of the AF motor 19 to generate pulses corresponding to the angular displacement. The object distance measuring sensor 17 receives light of the object through the zoom lens 2 to output a predetermined focus data signal (defocus signal).

The AF motor 19 drives the zoom lens 2 through a coupler 19a, which is provided on a body mount BM of the camera body and projects therefrom, and drives a coupler 31a provided on a lens mount LM of the zoom lens 2 when the connection between the couplers 19a and 31a is established.

A battery 22 powers not only the electronic components and electronic circuits in the camera body 1, but also the motor and electronic circuits in the zoom lens 2.

In the zoom lens 2 are provided a lens CPU 30 as a lens controlling means, a focusing mechanism 31 which rotates a focus adjusting cam ring (not shown) to relatively move the focusing lens groups in the optical axis direction to thereby effect the focusing, and a zooming mechanism 32 which rotates a zoom ring (not shown) to relatively move at least two groups of variable power lenses in the optical axis direction to effect the zooming.

The lens CPU 30 functions as a calculating means and includes a ROM 30A and a RAM 30B as memory means. The ROM 30A stores therein predetermined microprograms and algorithms for performing the operations including the automatic focusing operation, and steady data, etc. The RAM 30B stores therein the lens data to be transferred to the camera body 1.

The focusing mechanism 31 is connected to a coupler 31a, which is electrically connected to the coupler 19a when the zoom lens 2 is attached to the camera body 1, to transmit the rotational drive of the AF motor 19 to the focusing mechanism 31. The focusing mechanism 31 rotates the focus adjusting cam ring with the help of the rotational drive force.

The couplers 19a and 31a can be disconnected from one another by a disengaging means (not shown) so that a photographer can manually rotate a focus adjusting operation ring to adjust the focus in the manual focusing mode.

The zooming mechanism 32 is driven by a PZ (power zoom) motor 34 controlled by a PZ motor driving portion 33. The PZ motor driving portion 33 is controlled by the lens CPU 30 or a zoom switch SWPZ2 (FIG. 5) in the auto power zoom mode. The PZ motor driving portion 33 is controlled by the lens CPU 30 which receives the output of a zoom operation code member (plate) 38 which is manually controlled by a photographer in the manual power zoom mode. The auto power zoom mode and the manual power zoom mode are selected by the lens CPU 30 in response to the operation of a zoom switch SWPZ1.

To the lens CPU 30 are connected a PZ pulser 35 which detects the displacement (number of revolution) of the PZ motor 34 and generates a predetermined number of pulses corresponding thereto, a distance code plate (member) 36 which reads position data (object distance data) of the focus adjusting cam ring (focusing lens groups) driven by the focusing mechanism 31, a zoom code member (plate) 37 which reads the position data (focal length data) of the zooming cam ring (variable power lens groups) driven by the zooming mechanism 32, and a zoom operation code member (plate) 38 which inputs power zooming direction and speed data by the operation of the zoom operation switches SWPZ1 and SWPZ2.

Note that if the zoom lens is a single focus macro lens, since the displacement of the focusing lens group in the optical axis direction is increased, the zoom code member 37 which can provide more information, can be used as an object distance data inputting means, in place of the distance code member 36.

To the lens CPU 30 are also connected a lens judgement code member 39 which judges the kind of photographing lens that is being used (zoom lens, single focus lens, or single focus macro lens, etc.), and a K value input member 40 which inputs data of the K value at the telephoto extremity. In the illustrated embodiment, "K value" means the number of pulses of the AF pulser 21 necessary to move an image plane formed by the photographing lens 2 through a unit displacement, but is not limited thereto.

Each of the distance code members 36 and the other code members are usually comprised of a code plate secured to the peripheral surface of the cam ring or the like, which is rotated during zooming or focusing etc., and brushes secured to the stationary lens barrel which have a plurality of electrical contacts independently brought into slide contact with the codes of the associated code plate. The positions of the cam rings are detected as bit information by the combination of the codes ("H" and "L") with which the electrical contacts of the brushes come into contact.

A lens interface 41 is connected to a data input terminal of the lens CPU 30. The data communication between the lens CPU 30 and the indication CPU 11 is effected through the lens interface 41 to which a macro code member 42 is connected to input macro data thereto in the macro mode.

Circuit of Camera Body

The camera body 1 is provided with a known retractable strobe light emitting unit 45 having an auxiliary infrared light emitting member 44. The strobe light emitting unit 45 is supported by a supporting mechanism so as to move between a light emitting position and a retracted position in which the strobe light emitting unit 45 is retracted in the camera body 1.

The auxiliary infrared light emitting member 44 is provided on a strobe light emitting surface, so that when the strobe light emitting unit 45 is in the light emitting position, the auxiliary infrared light emitting member 44 emits a fringe pattern of infrared light onto an object to be taken if a release button (not shown) is pressed down by half step. The light emission of the auxiliary infrared light emitting member 44 is controlled by the main CPU 10 through a light emission control circuit 46.

Whether the strobe light emitting unit 45 is in the light emitting position is detected by a detecting member 47 which outputs the detection signal to the main CPU 10.

Figure 4:
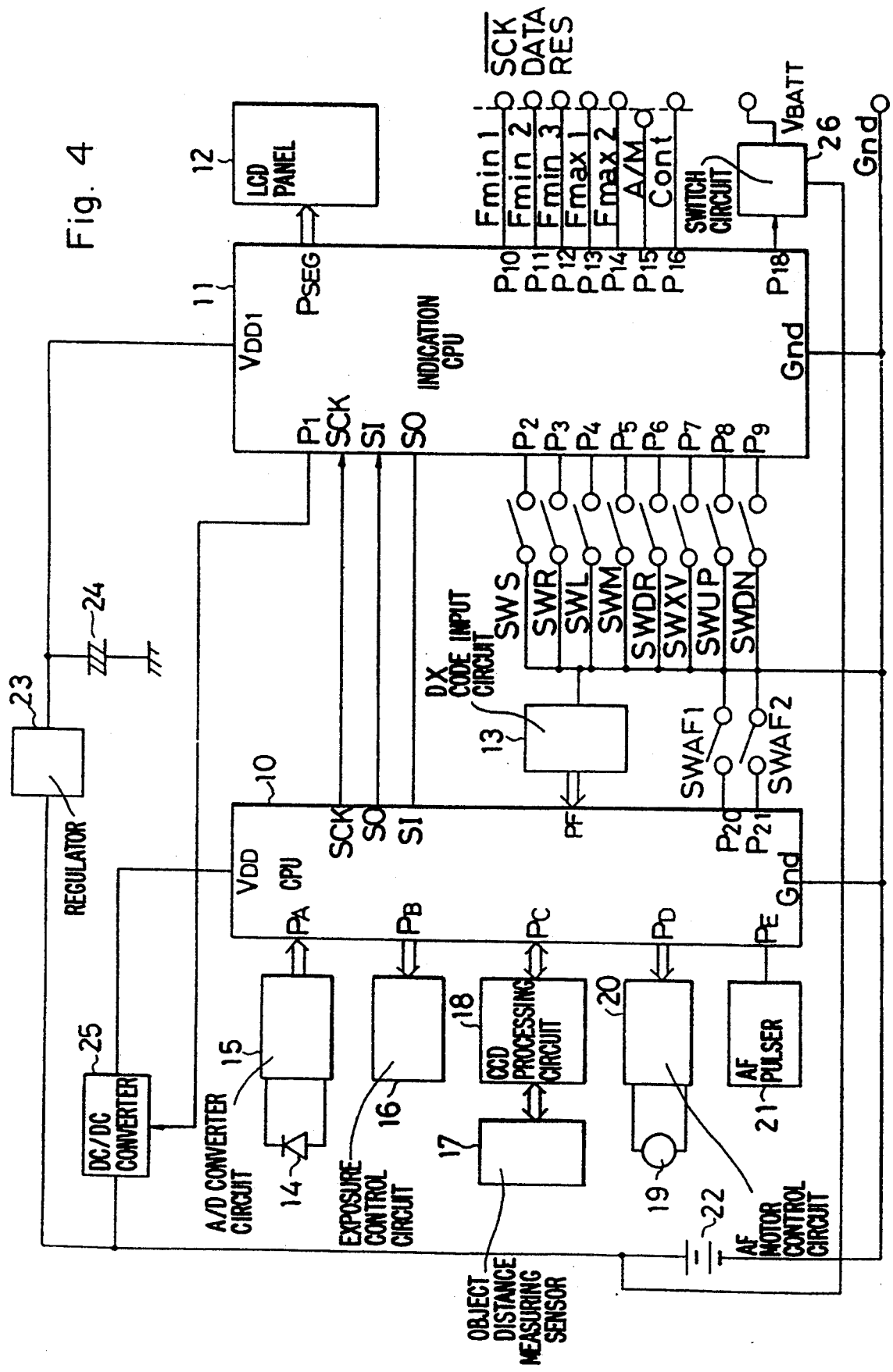
FIG. 4 is a block diagram of a main circuit arrangement of a camera body in a camera system shown in FIG. 3.

The arrangement of the control system of the camera body 1 and the zoom lens 2 will be described below in detail with reference to FIGS. 4 and 5. FIG. 4 is a block diagram of a main construction of the electrical system of the camera body 1.

The voltage of the battery 22 which is controlled by a regulator 23 and which is backed up by a super capacitor 24 is supplied to a terminal VDD1 of the indication CPU 11. The indication CPU 11 is always activated at a constant voltage input to the terminal VDD1.

Terminals P1 and P2 of the indication CPU 11 are connected to a DC/DC converter 25 which turns the power source of the main CPU 10 ON and OFF and a photometer switch SWS which is turned ON when the shutter button (not shown) is pressed by a half step, respectively.

Furthermore, terminals P3 and P4 of the indication CPU 11 are connected to a release switch SWR which is turned ON when the shutter button is fully pressed and a lock switch SWL which is turned ON when the camera is brought into a position suitable for photographing, respectively.

The DC/DC converter 25 is actuated when the lock switch SWL is turned ON and when the photometer switch SWS or the release switch SWR is turned ON, and in accordance with command from the indication CPU 11 upon inputting the lens data from the photographing lens 2, to supply the terminal VDD1 of the main CPU 10 with a reference constant voltage to thereby actuate the main CPU 10.

Furthermore, terminals P5, P6, P7, P8 and P9 of the indication CPU 11 are connected to a mode switch SWM, a drive switch SWDR, an exposure correction switch SWXV, an up-switch SWUP and a down-switch SWDN, respectively.

The indication CPU 11 operates in accordance with the operative and inoperative states of these switches SWM, SWDR, SWXV, SWUP, and SWDN. For instance, the exposure modes including a programmed exposure mode, an automatic exposure mode, and a manual exposure mode are selected in accordance with the operation of the mode switch SWM. Similarly, drive modes including a single shot mode and a continuous shot mode are selected in accordance with the operation of the drive switch SWDR. The selection modes can be varied in accordance with the operation of the up-switch SWUP and down-switch SWDN at the position in which the exposure modes or the drive modes can be selected.

The indication CPU 11 makes it possible to change the exposure value when the exposure switch SWXV is turned ON. Namely, the exposure value can be increased and decreased in accordance with the operation of the up-switch SWUP and the down-switch SWDN, respectively.

The indication CPU 11 has a group of indication control terminals PSEG connected to an indicating LCD 12 through a bus line. The indicating LCD 12 indicates the necessary photographing data in accordance with the command of the indication CPU 11 when the lock switch SWL is turned ON.

Seven terminals P10 through P16 of the indication CPU 11 are connected to electrical contacts Fmin1, Fmin2, Fmin3, Fmax1, Fmax2, A/M, and Cont provided on the body mount BM of the camera body, respectively. A terminal P18 of the indication CPU 11 is connected to a switch circuit 26.

The electrical contacts Fmin1, Fmin2 and Fmin3 also function as communication terminals for data communication between the photographing lens 2 and the indication CPU 11. Namely, the electrical contacts Fmin1, Fmin2 and Fmin3 constitute a serial clock signal inputting and outputting terminal $\overline{SCK}$, a data transmitting and receiving terminal DATA, and a reset signal outputting terminal RES, respectively. The terminals P10, P11 and P12 of the indication CPU 11 are always pulled up within the indication CPU 11.

The output of the switch circuit 26 is connected to a terminal VBATT and functions as a switch for establishing and breaking the electrical connection between the battery 22 and the terminal VBATT in accordance with the level of the terminal P18. The terminal Gnd of the indication CPU 11 is connected to the ground terminal Gnd of the battery 22.

The indication CPU 11 and the main CPU 10 communicate with each other through serial terminals SCK, serial-in terminals SI and serial-out terminals SO. In the data communication, data is transferred, for example using command codes.

Contact groups PA, PB, PC, PD, PE and PF of the main CPU 10 are connected to an A/D converter circuit 15, the exposure control circuit 16, the CCD processing circuit 18, the AF motor control circuit 20, the AF pulser 21, and the DX code input circuit 13, respectively.

The terminal P20 of the main CPU 10 is connected to a first AF switch SWAF1 which selects an auto focus mode in which the focusing is automatically effected by the AF motor 19 and a manual focus mode in which the focusing is manually effected by a photographer. The terminal P21 of the main CPU 10 is connected to a second AF switch SWAF2 which switches the mode of the shutter release between a focus priority mode and a release priority mode.

The first and second AF switches SWAF1 and SWAF2 are mechanically associated with each other so that, for example, when the manual focus mode is selected by the first AF switch SWAF1, the second AF switch SWAF2 is switched to the release priority mode. Namely, when one of the AF switches SWAF1 and SWAF2 is turned ON, the other is turned OFF.

Circuit of Zoom Lens

The circuit arrangement of the electrical system provided in the zoom lens 2 will be explained below, with reference to FIG. 5.

The lens mount LM of the zoom lens 2 is provided with electrical contacts VBATT, CONT, RES (Fmin3), $\overline{SCK}$ (Fmin1), DATA (Fmin2), GND, Fmax1, Fmax2 and A/M corresponding to the associated electrical contacts provided on the body mount BM when the zoom lens 2 is attached to the camera body 1. The electrical contacts of the lens mount are electrically connected to the corresponding electrical contacts of the body mount both of which are designated with the same reference numerals.

The contact VBATT on the lens side is connected to the PZ driver 33 so that the power of the battery 22 is directly supplied to the PZ motor 34 through the contact VBATT by the switching operation of the PZ driver 33.

The contacts Fmax1 and Fmax2 of the lens side function also as a steady information transmitting means for transmitting the minimum diaphragm F-number (maximum value) of two bits to the camera body, similarly to those provided on a conventional AE lens. Namely, the contacts Fmax1 and Fmax2 on the lens side are grounded through the switches SWmax1 and SWmax2 so that maximum F-number data is formed in accordance with a combination of the levels of the switches SWmax1 and SWmax2 depending on the combinations of ON/OFF states thereof.

The contact A/M on the lens side has the function of sending the auto/manual information of the diaphragm to the camera body 1 and is grounded through a selection switch SWA/M. The selection switch SWA/M is associated with the rotation of a diaphragm ring (not shown) of the photographing lens 2 so that when the diaphragm ring is in the auto position and the manual position, the selection switch is turned ON and OFF, respectively.

The contacts Fmin1, Fmin2, and Fmin3 on the lens side function not only as a steady information transmitting means for transmitting the open F-number information of three bits to the camera body 1, similarly to those provided on a conventional (old) AE lens, but also as data communication contacts between the camera body and the zoom lens.

To provide both the steady information transmitting function and the data communication function on the contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to the lens contacts Fmin1, Fmin2 and Fmin3, and at the bases thereof to the contact CONT through fuse portions H1, H2 and H3 so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes the voltage of the contact CONT to drop to the ground in order to obtain the open F-number data from the lens contacts Fmin1, Fmin2 and Fmin3. As a result, a transistor (or transistors) Tr to which the fuse portion(s) is (are) connected is (are) turned ON, so that the emitter(s) of the transistor(s) which has (have) been turned ON become(s) high level "H", and the emitter(s) of the transistor(s) which has (have) not been turned ON become(s) ground level. Namely, the transistors Tr are selectively turned ON or OFF in accordance with the connection of the fuse portions H1, H2 and H3 to change the level of the emitters thereof. Consequently, the three-bit open F-number data is output to the lens contacts Fmin1, Fmin2 and Fmin3.

Terminals CONT, RES, $\overline{SCK}$, DATA and GND of the lens interface 41 are connected to the terminals CONT, Fmin3, Fmin1, Fmin2 and GND on the lens side, respectively.

The lens contact CONT is connected to the bases of the transistors Tr and to the terminal CONT of the lens interface 41, as mentioned above. The switching of the power supply from the terminal CONT of the lens interface is effected through the terminal RES (lens terminal Fmin3). After the data on the open F-number is read by the indication CPU 11, and when the terminals CONT and RES become levels "H" and "L", is respectively, the power supplied to the lens CPU 30.

The terminal VDDB of the lens interface 41 is connected to the terminal VDD of the lens CPU 30 through a condenser C2 so that the constant voltage supplied from the terminal CONT of the camera body 1 is supplied to the lens CPU 30.

Terminals DIS1, DIS2 and DIS3 of the lens interface 41 are connected to the distance code plate 36 which constitutes an initial value data forming means so that the distance data signals of the object distance corresponding to the position of the focusing cam ring driven by the focusing mechanism 31 are sent as three bit signals to the terminals DIS1, DIS2 and DIS3.

Terminal MACRO of the lens interface 41 is connected to the macro code portion 42 which functions as a macro switch and is turned ON when the zoom operation ring is actuated to switch the photographing lens 2 to the macro mode. It is also possible to form the macro code portion 42 with a part of the codes of the zoom code member 37 when the mode is switched to the macro mode by the zoom operation ring.

The input and output terminals of the lens interface 41 are connected to the corresponding input and output terminals of the lens CPU 30. Reset terminal $\overline{RESB}$, clock terminal CLK, serial-in terminal SIS, serial-out terminal SOS, terminal $\overline{CE}$, terminal $\overline{SOE}$, terminal $\Phi IN$, and terminal $\overline{KAFEND}$, of the lens interface 41 are connected to the reset terminal $\overline{RESET}$, the serial clock terminal $\overline{SCK}$, the serial-out terminal SO, the serial-in terminal SI, the terminal P43, the terminal P40, the terminal PCL, the terminal POO, of the lens CPU 30, respectively. A terminal CRES of the lens interface 41 is grounded through a delay condenser C1.

The lens CPU 30 controls the rotation of the PZ motor 34 through the PZ driver 33 which is connected to the control terminal of the lens CPU 30. The lens CPU 30 is also connected to the PZ pulser 35 and the lens judgement code 39.

The terminals P30, P31, P32 and P33 and the terminals P62 and P63, of the lens CPU 30 are connected to the codes of the zoom code member 37. The lens CPU 30 performs the arithmetic operation based on the combination of input levels of these terminals P30, P31, P32, P33, P62, and P63 to obtain focal length data for a zoom lens and object distance data for a single focus macro lens.

The terminals P21 through P29 of the lens CPU 30 are connected to switches such as the auto focus switch SWAF3, the power zoom switches SWPZ1 and SWPZ2, etc. The terminals P24 through P29 are also connected to the zoom operation code member 38.

The zoom lens 2 is provided with a clock pulse generating circuit 43 as a clock outputting means. The lens CPU 30 operates synchronously with the clock pulses generated by the clock pulse generating circuit 43.

Communication between Camera Body and Zoom Lens

The communication between the camera body 1 and the zoom lens 2 is carried out as follows.

The indication CPU 11 causes the terminal CONT to drop to "L" and reads the open F-number and the minimum F-number data. Thereafter, the terminal CONT and the terminal RES (Fmin3) are both made "H", so that the lens interface 41 and the lens CPU 30 are reset. Consequently, the indication CPU 11 is transferred to the initial value data inputting state.

The lens CPU 30 sets the initial value data read through the zoom code member 37 or the calculated initial value data in a shift register within the lens interface 41 asynchronously with the clock signal output from the camera body 1.

The initial value data set in the shift register is successively output from the terminal DATA synchronously with the clock signal from the camera body 1. The old data communication mentioned above is carried out by hardware within the lens interface 41. In the illustrated embodiment, 19 byte data is transferred to the camera body 1.

Upon completion of the old data communication, the terminal $\overline{KAFEND}$ of the lens interface 41 drops to "L", which indicates the completion of the old data communication. As a result, the lens CPU 30 is ready to receive a commencement signal of a new data communication from the camera body 1.

When the lens CPU 30 receives a signal for the commencement of a new data communication from the camera body 1, the terminal DATA (Fmin2) which has been "H" drops to "L" and then again returns to "H" again thereafter. This makes it possible to commence the new data communication.

In the new data communication, data is transferred from the zoom lens 2 to the camera body 1 or from the camera body 1 to the zoom lens 2 in accordance with the command code output from the camera body 1.

The new communication is carried out synchronously with the clock signal output from the zoom lens 2 (clock pulse generating circuit 43). For example, the lens CPU 30 outputs the clock signal from the terminal SCK and receives the data output from the camera body 1 through the terminal DATA.

If the data is data reading command, the lens CPU 30 first outputs the receipt acknowledgement signal and then the data designated by the command, from the terminal DATA. When the data output is finished, the lens CPU 30 causes the terminal DATA to first drop to "L" and then become "H" again, so that the completion of the data output is transmitted to the camera body 1.

The command code and the data transferred between the zoom lens 2 and the camera body 1 are for example as shown in table 1 below.

TABLE 1

| zoom lens → camera body | |
|---|---|
| AF information | 0011.0001(31H) |
| AF information | 0011.0010(32H) |
| all data | 0011.0011(33H) |
| (includes IRC data) | |
| each single bite | 0101.XXXX(5XH) |
| lens information 1 | 0110.0000(60H) |
| lens information 2 | 0110.0001(61H) |
| camera body → zoom lens | |
| focal length information fWide | 0110.0010(62H) |
| focal length information fTele | 0110.0011(63H) |
| focal length information fX(present) | 0110.0100(64H) |
| lens drive information | 0110.0110(66H) |
| lens accommodation | 1001.0000(90H) |
| lens return | 1001.0001(91H) |
| PH ON | 1001.0010(92H) |
| PH OFF | 1001.0011(93H) |
| effective AF FNo. | 1001.0100(94H) |
| switching command | 1100.1000(C8H) |
| sleep | 1100.0001(C1H) |
| test mode | 1111.XXXX(FXH) |

The main operation of the camera system of the present invention will be explained below in more detail.

Timer Routine of Indication CPU

Figure 6:
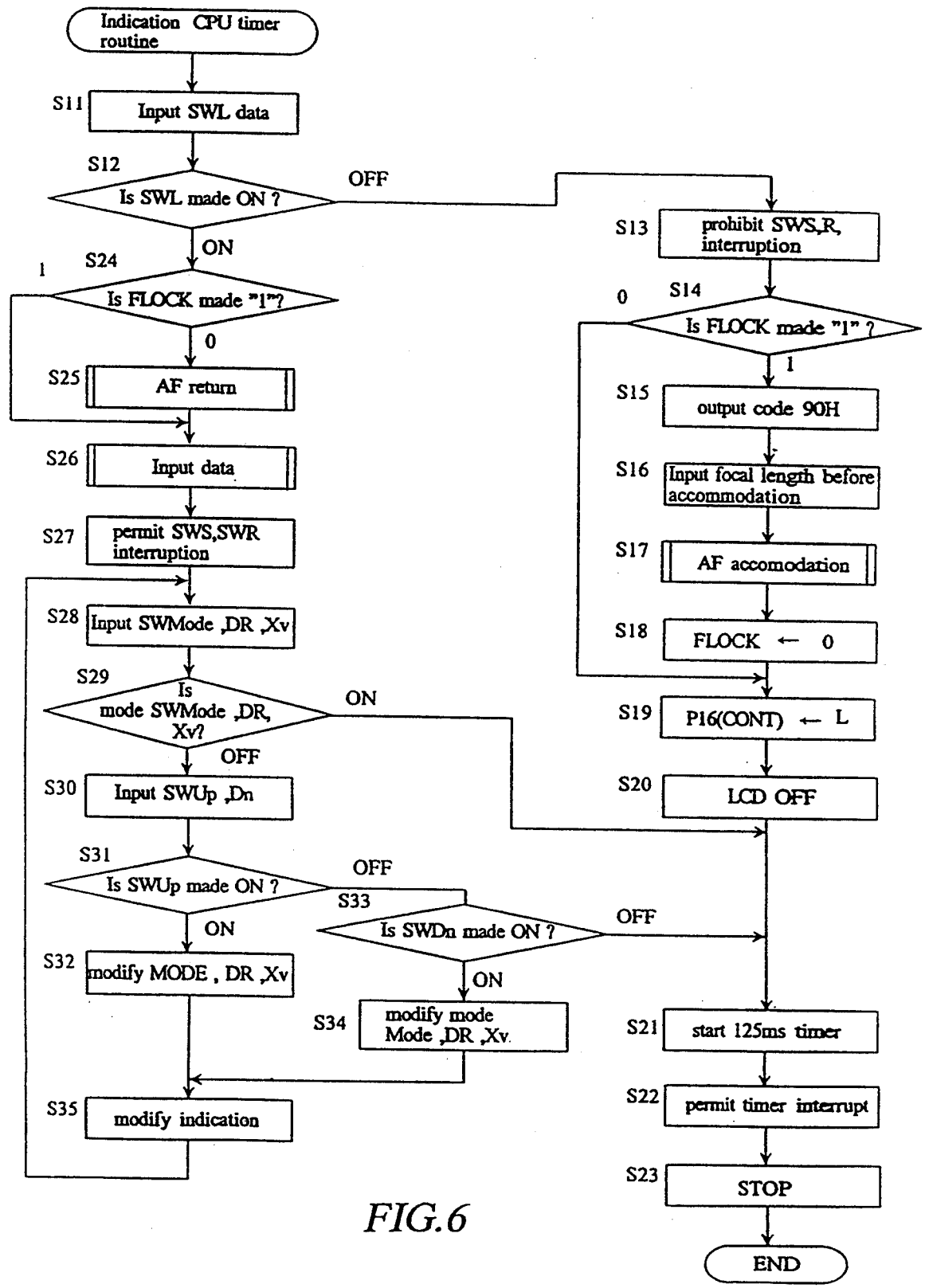
FIG. 6 is a flow chart of a timer routine of an indication CPU of a camera body.

The main operation (timer routine) of the indication CPU 11 will be explained with reference to FIG. 6. The main operation is performed by the indication CPU 11 in accordance with a program stored in the internal ROM 11a of the indication CPU 11.

The indication CPU 11 checks whether the lock switch SWL is turned ON or OFF at steps S11 and S12. If the lock switch SWL is turned OFF, the interruption of the operation by the switch is prohibited (step S13), and then, the state of the lock flag FLOCK is checked to check the accommodation of the lens (step S14).

When the lock SWL is OFF a picture cannot be taken and the photographing lens is retracted thus realizing a compact and portable camera.

To this end, in the camera system of the present invention, the zoom lens 2 is automatically retracted to reduce the length thereof by the automatic focusing mechanism 31 and the automatic power zoom mechanism 32 when the lock switch SWL is turned OFF.

However, a photographer may also turn the lock switch SWL OFF when he or she does not desire that the photographing lens in the camera be retracted. For instance, the lock switch SWL may be turned OFF to reduce the power consumption while a photographer is waiting for the next shot, while maintaining the focal length and focal point as they are. In such a case, if the photographing lens is automatically retracted when the lock switch SWL is turned OFF, the focal length and focal point will vary requiring the photographer to go to the trouble of readjusting the focal length and focal point.

To prevent this, in the camera system according to the present invention, at the moment when the lock switch SWL is switched from ON to OFF, the focal length and the focal point (axial position of the focusing lens group or the object distance) are memorized and the photographing lens is retracted. When the lock switch SWL is turned ON again the focal length and the focal point, from before the retraction of the photographing lens, are automatically reinstated regardless of the photographer's intention when the lock switch SWL is turned OFF. Thus, according to the present invention, the problem mentioned above can be eliminated.

In the camera system of the present invention, the retraction and return operations with respect to the automatic focusing mechanism 31 are carried out by the main CPU 10, and the retraction (accommodation) and return operations, with respect to the power zoom mechanism 32, are carried out by the lens CPU 30, respectively. Note that the main CPU 10 and the lens CPU 30 are supplied with electrical power only when the lock switch SWL is turned ON, otherwise no power is supplied thereto. Therefore, the data of the retraction and the return is controlled by the indication CPU 11 which always operates.

The lens retraction (accommodation) operation is effected in steps S15 through S18. Since the zooming operation is controlled by the lens CPU 30, the command code 90H for the accommodation of the lens is sent to the lens CPU 30 and the focal length data, before the accommodation, is input from the zoom code member 37 to the lens CPU 30. Since the automatic focusing mechanism 31 is controlled by the camera body side, the operation is performed by the main CPU 10 in an AF accommodation sub-routine at step S17.

Upon completion of the AF accommodation, the lock flag FLOCK is set at "0" (step S18), and the control proceeds to step S19. If the lens has been already accommodated or retracted, since the lock flag FLOCK is "0," the control skips step S15 through step S18.

At step S19, the terminal P16 (terminal CONT) drops to "L" and then the power source of the lens CPU 30 and the LCD 12 are turned OFF (step S20). Thereafter, the timer routine is intermittently performed at 125 ms cycle (steps S21 through S23). Namely, the operation of steps S11 through S23 is intermittently repeated during the period in which the lock switch SWL is OFF.

If the lock switch SWL is turned ON, the indication CPU 11 judges the state of the lock flag FLOCK at step S24. Since the lock flag FLOCK is "0" when the lock switch SWL is turned ON for the first time, the AF return operation is performed by the main CPU 10 to return the focal point of the photographing lens to the one before the accommodation or retraction (steps S12, S24 and S25).

At step S26, the lens data inputting sub-routine is called to judge the type of attached lens in accordance with the input data. If necessary and if possible, the lens CPU 30 performs the return of the zoom mechanism 31.

Upon completion of the data input operation, interruption of the control by the photometer switch SWS and the release switch SWR is permitted so that the release can be effected. Thereafter, the control proceeds to step S28.

When the mode switch SWM, the drive switch SWDR, the exposure correction switch SWXV, the up-switch SWUP, and the down-switch SWDN are actuated, the changing operation of the mode, etc., and the indication operation of the selected mode are performed at steps S28 through S35.

If none of these switches are actuated, the intermittent operation is performed in accordance with the 125 ms timer operation (steps S29, S31, S33, S21).

Input Operation of Lens Data

The input operation (data communication) of the lens data between the camera body 1 and the zoom lens 2 at step S26 of the timer routine will be described below.

Figure 7A:
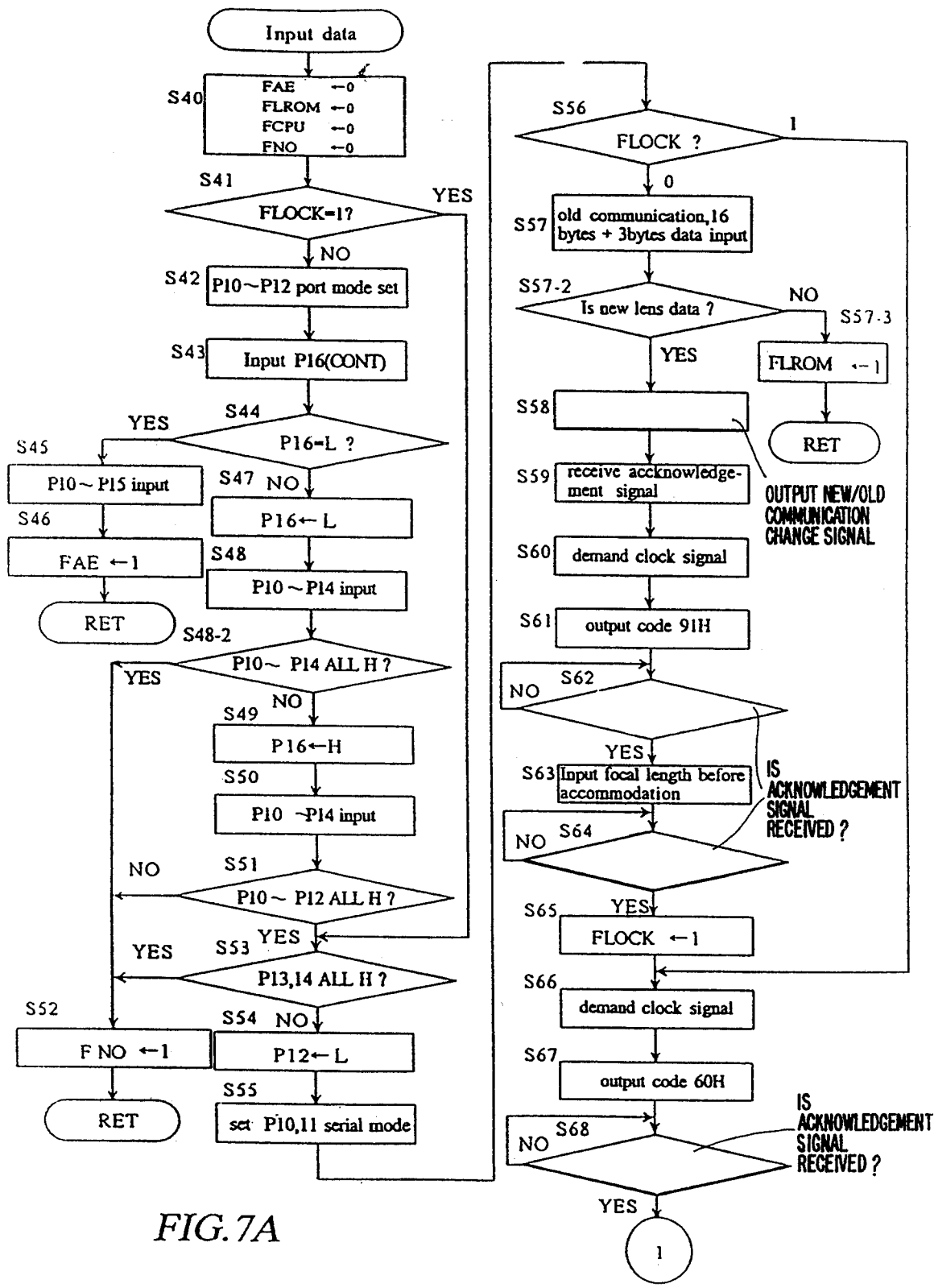
FIGS. 7A, 7B and 7C are flow charts of the data communication of a camera body.
Figure 7B:
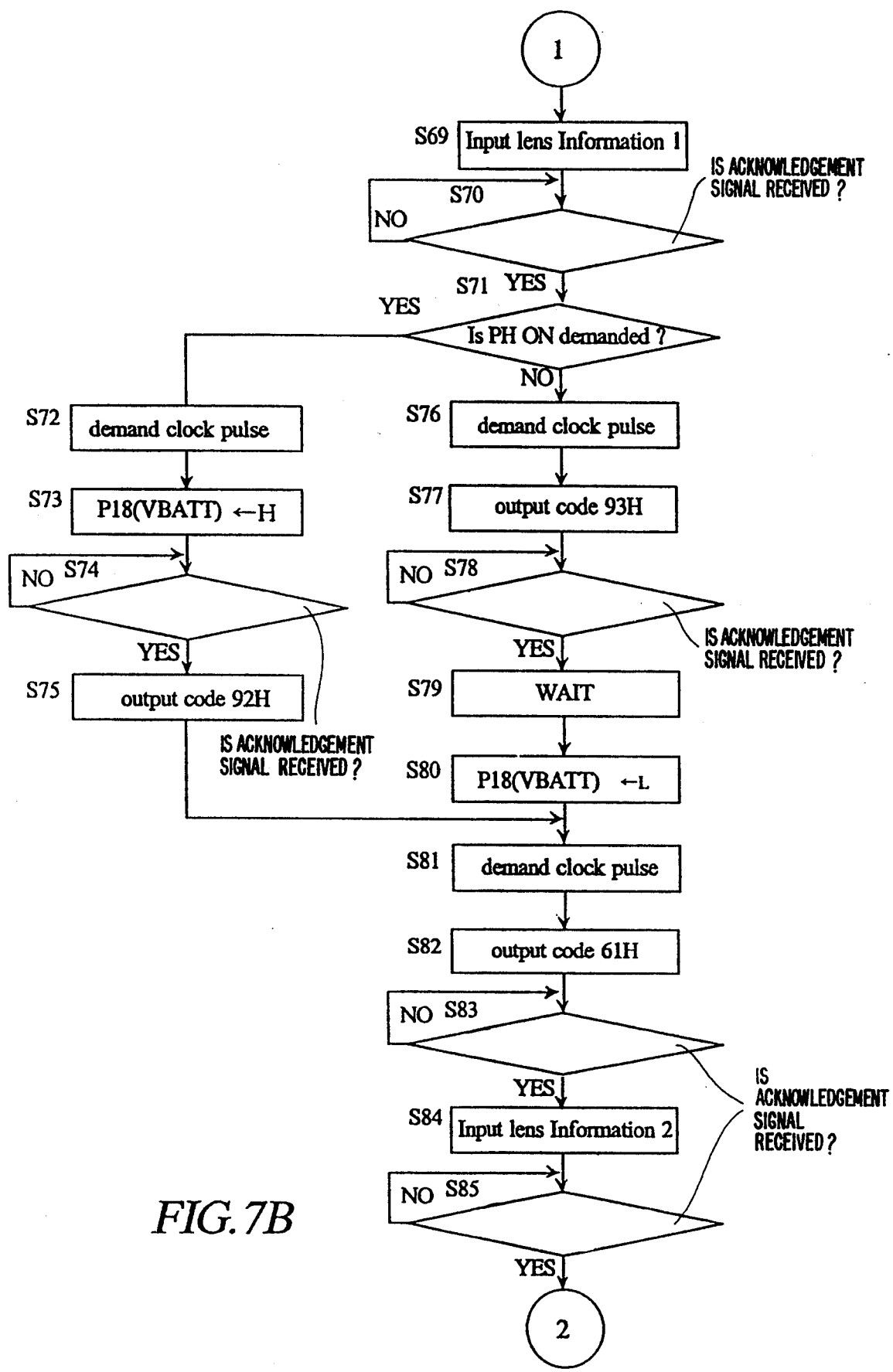
Figure 7C:
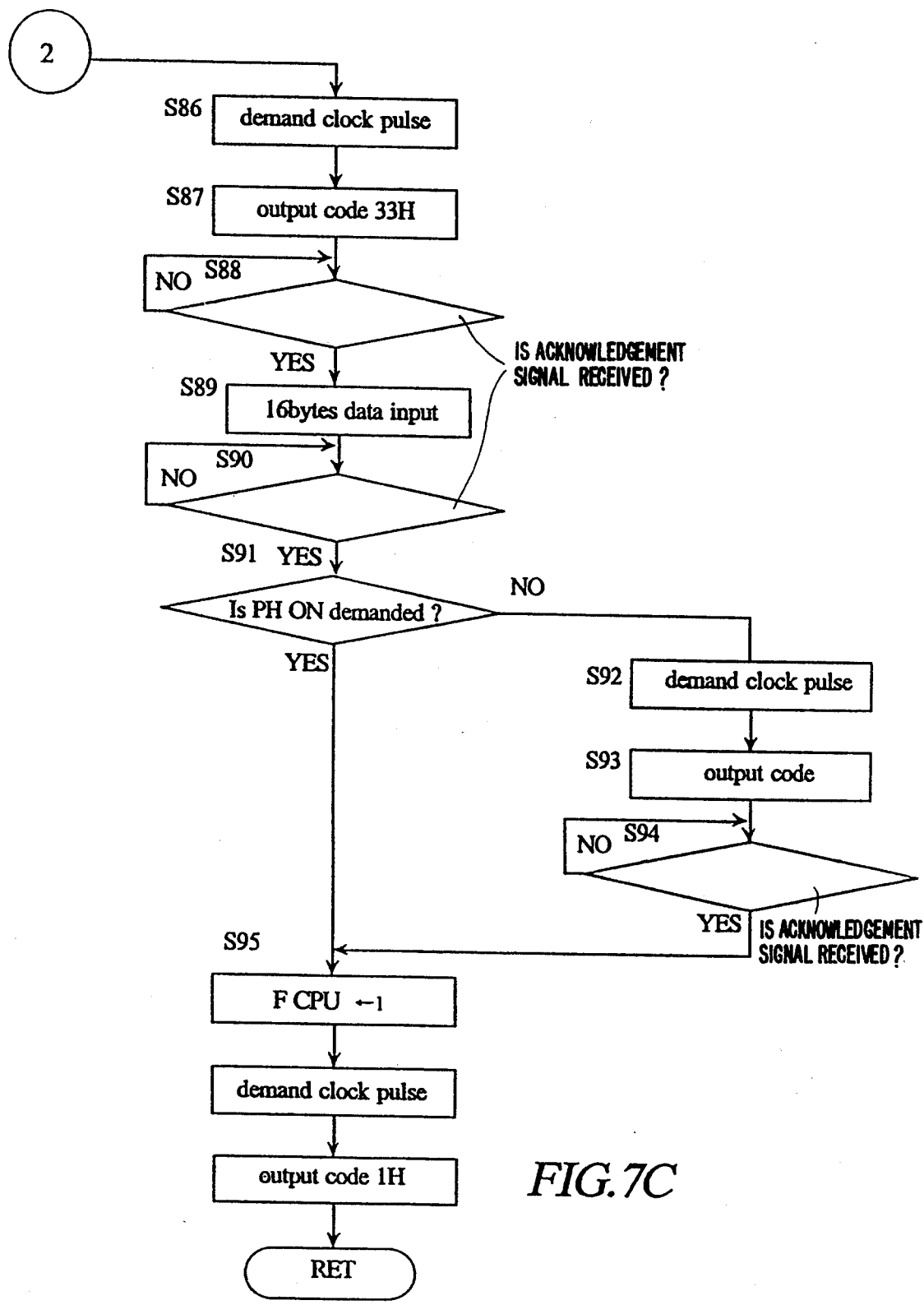

The discussion will first be directed to the operation of the camera body 1 with reference to FIGS. 7A–7C. This operation is carried out by the indication CPU 11.

First, four lens flags FAE, FLROM, FCPU and FNO for discriminating the lens are reset at "0" (step S40). The lens flag FAE identifies a conventional (old) AE lens having no lens ROM. The lens flag FCPU identifies a new AE lens having a lens CPU, for example, the zoom lens 2 having the lens CPU 30 shown in FIGS. 1 and 3, etc. The lens flag FLROM identifies a conventional AE lens having a lens ROM. Lastly, the lens flag FNO determines if the lens is not attached to the camera body or if there is trouble with the photographing lens.

After that, the lock flag FLOCK is checked to determine whether or not its value is "1" at step 41. Since the control proceeds to step S41 for the first time after the lock switch SWL is turned ON, the flag FLOCK is "0," so that the control proceeds to step S42. Conversely, after the second time and when the lens has a lens CPU, the flag FLOCK is "1," so that the control jumps to step S53.

At step S42 the terminals P10 through P12, which are used for serial communication with the zoom lens 2, are set at the input mode and then the level of the terminal P16 (the contact Cont) is input and checked (steps S43 and S44).

If there is no contact Cont on the mounted lens, the contact Cont on the camera body side comes into contact with the surface of the lens mount and is accordingly grounded to detect that the mounted lens is an old AE lens having no lens ROM.

When the mounted lens is the old AE lens, the levels of the terminals P10 through P15 are input to read the data on the open F number, the maximum F number and the diaphragm A/M switching data, and the old AE lens flag FAE is set at "1" (steps S45 and S46). The control then is returned.

If a photographing lens is not mounted or if a lens having the lens data is mounted, the level of the Cont contact is "H." Consequently, the level of the terminal P16 drops to "L" to stop the supply of electrical power to the lens side. Thereafter, the levels of the other terminals P10 through P15 are input (step S48).

Figure 5:
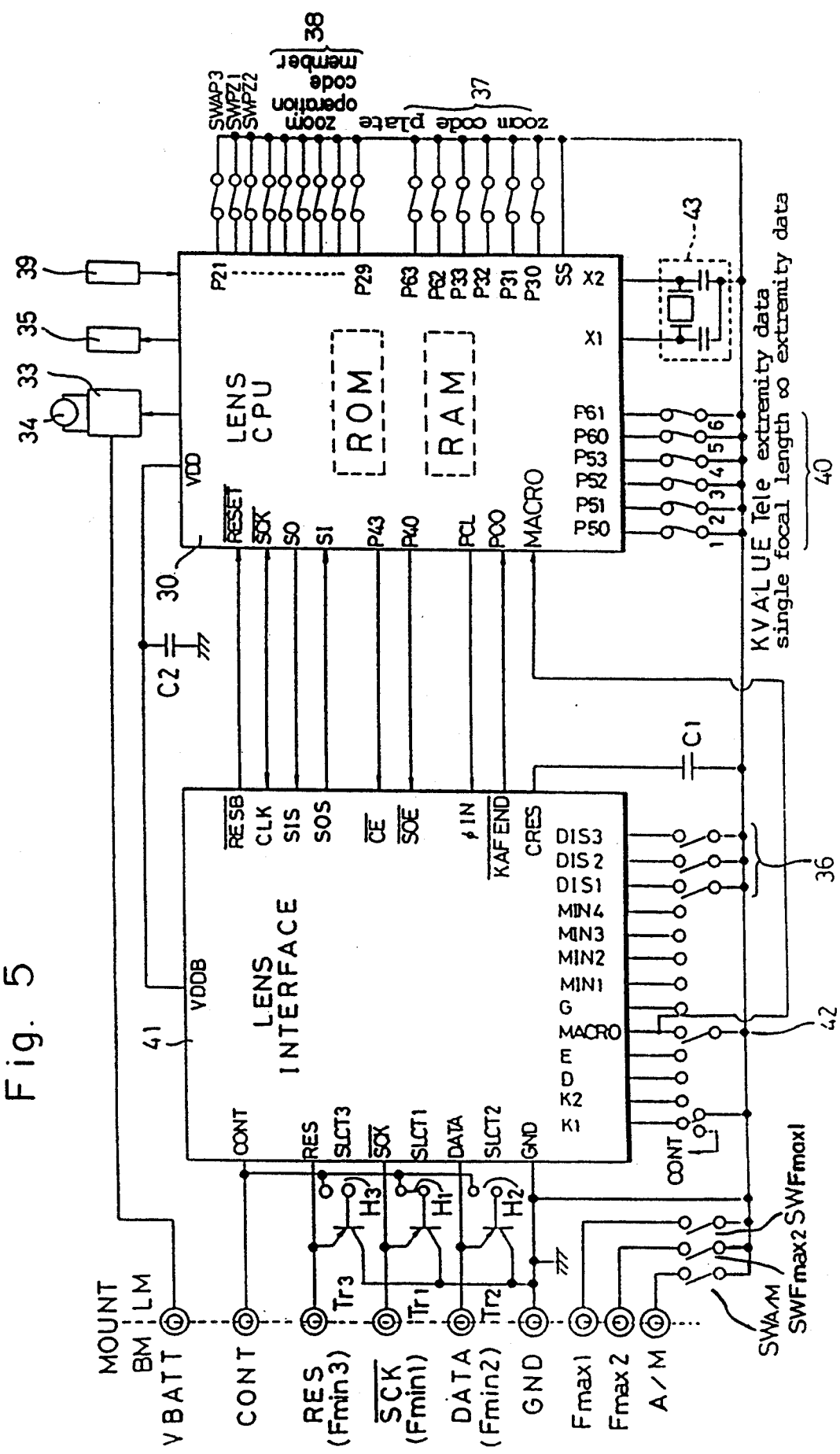
FIG. 5 is a block diagram of a main circuit arrangement of a taking lens in a camera system shown in FIG. 3.

As can be seen in FIG. 5, when the transistors Tr are connected to the lens contacts Fmin1 through Fmin3, the open F number can be detected in accordance with the combination of levels of the lens contacts Fmin1 through Fmin3, depending on the combination of ON/OFF states of the transistors Tr. The maximum F number can be detected in accordance with the combination of lens contact levels Fmax1 and Fmax2, depending on the combination of ON/OFF states of the switches SWFmax1 and SWFmax2. The level of the diaphragm A/M contact is used to detect whether the diaphragm is automatic or manual.

Thereafter, whether the levels of the terminals P10 through P14 are all "H" is checked. If the levels of P10 through P14 are all "H," the no lens flag FNO which represents that no lens is attached is set at "1" (steps S48-2, S52). Thereafter, control is returned.

If any one of the levels of the terminals P10 through P14 is "L," the terminal P16 is set at "H" to supply the power to the zoom lens so that the lens CPU and the lens ROM are activated. Thereafter, the levels of the terminals P10 through P14 are input (steps S49 and S50).

If any one of the levels of the terminals P10 through P12 is "L," the no lens flag FNO is set at "1," since it is then considered that there is some trouble with the photographing lens (lens ROM or lens CPU) (steps S51 and S52).

If all of the levels of the terminals P10 through P12 are "H," whether or not both the levels of the terminals P13 and P14 are "H" is checked at step S53. If both the levels of the terminals P13 and P14 are "H," the no lens flag FNO is set at "1" (step S52), since it is then considered that no photographing lens is attached. The control is then returned.

If at least one of the terminals P13 and P14 is "L," the level of the terminal P12 drops to "L" (step S54), and the terminals P10 and P11 are set at the serial communication mode (step S55), since the mounted lens is a new CPU lens (zoom lens). Thereafter, control proceeds to step S56.

At step S56, whether or not the lock flag FLOCK is "1" is checked. Since FLOCK is "0" when the control proceeds to step S56 for the first time after the lock switch SWL, the control proceeds to step S57 to perform the old data communication. Conversely, if FLOCK is "1," after the second time, the control skips steps S57 through S65 to step S66 so as not to carry out the old data communication.

At step S57, the lens data of 16 bytes and the rear converter data of three bytes are input through the old communication.

When the input of the data by the old communication is completed, whether or not the lens is the new lens (zoom lens) having the lens CPU based on the input data is checked. If the lens is not the new lens, the lens is the conventional AE lens having the lens ROM, and accordingly the flag FLROM is set at "1" (steps S57-2 and S57-3). Thereafter, control is returned.

If the lens is the new lens, the new/old switching signal is output to the terminal DATA (step S58), so that the clock demand signal is output to the lens side in response to the acknowledgement signal issued from the lens side, whereby the lens CPU 30 outputs the clock signal (steps S59 and S60).

Thereafter, the lens return command code 91H is sent to the lens CPU 30 which is ready for returning the power zoom mechanism at step S61. The control waits until the acknowledgement signal is issued from the lens CPU 30 (step S62).

Upon receipt of the acknowledgement signal, before accommodation, the focal length data is sent to the lens CPU 30 which then returns the power zooming (step S63). When the returning is finished, which can be detected by the issuance of the acknowledgement signal from the lens CPU 30, the lock flag FLOCK is set at "1" (steps S64 and S65). Thereafter, control proceeds to step S66.

At step S66 the clock demand signal is output so that the lens CPU 30 outputs the clock signal. The command code (lens information 1) 60H is output synchronously with the clock signal, and the control does not proceed until the acknowledgement signal is issued (steps S67 and S68). The command code 60H is used to read lens information including the switch setting data on the lens side and the power hold demand signal, etc.

Upon receipt of the acknowledgement signal the lens information output from the lens CPU 30 is received (step S69). The completion of the receipt of the lens information is detected by the receipt of the acknowledgement signal fed from the lens CPU 30 (step S70).

Upon receipt of the acknowledgement signal it is checked whether or not the transferred data demands the power hold at step S71. If there is a power hold demand, the lens CPU 30 is requested to output the clock signal (step S72). Thereafter, the level of the terminal P18 becomes "H" and the control does not proceed until the acknowledgement signal is issued from the lens CPU 30 (steps S73 and S74).

Upon receipt of the acknowledgement signal, the power hold-ON code 92H is output (step S75). Thereafter, the control proceeds to step S81.

If there is no power hold demand at step S71, the output of the clock signal is demanded at step S76. Thereafter, the power hold-OFF code 93H is output synchronously with the clock signal (step S77). After that, whether or not the acknowledgement signal is output from the lens CPU 30 is checked at step S78.

Upon receipt of the acknowledgement signal, the level of the terminal P18 becomes "L", after a lapse of predetermined time (steps S79 and S80), to stop the supply of the power to the PZ motor 34. Then, the control proceeds to step S81.

At step S81, the output of the clock signal is demanded. The demand code 61H which demands the lens information 2 is output synchronously with the clock signal at step S82. Thereafter, whether or not the acknowledgement signal is output is checked at step S83.

If the acknowledgement signal is received, the subsequent lens information 2 is then received at step S84. Thereafter, whether or not the acknowledgement signal is output is checked at step S85.

If the acknowledgement signal is received at step S85, the clock signal is demanded at step S86. The demand code 33H for demanding all the data is output synchronously with the clock signal at step S87. Thereafter, whether or not the receipt acknowledgement signal is received is checked at step S88.

If the receipt acknowledgement signal is received, the subsequent data for 16 bytes is input at step S89. Thereafter, whether or not the transmission completion acknowledgement signal is received is checked at step S90.

If the transmission completion acknowledgement signal is received at step S90, whether or not there is a power hold demand is checked at step 91. If there is a power hold demand, the new AE lens flag FCPU is set at "1" (step S95). The indication CPU 11 demands the clock signal from the lens CPU 30. Thereafter, a sleep-code (C1H) is output synchronously with the clock signal of the lens CPU 30, and the control is returned.

Conversely, if there is no power hold demand at step S91, the clock signal is demanded at step S92 and a predetermined code is output (step S93). Thereafter, whether or not the receipt acknowledgement signal is received is checked at step S94. If the receipt acknowledgement signal is received, the new CPU lens flag FCPU is set at "1".

The indication CPU 11 demands the clock signal from the lens CPU 30. Thereafter, the sleep code (C1H) is output synchronously with the clock signal of the lens CPU 30 and control is then returned (steps S96, S97).

Namely, the indication CPU 11 causes the lens CPU 30 to sleep every time the communication with the lens CPU 30 is finished.

In the second data inputting operation and those subsequent thereto, since the lock flag FLOCK has been set at "1" at step S65, the checking of whether the lens is the old AE lens, etc. (steps S42 through S48-2), the old data communication, and the output of the focal length before the accommodation (retraction) at steps S57 through S65 are carried out. This decreases the communication time in the 125 ms timer operation resulting in reduced power consumption.

Main Routine of Lens CPU

Figure 8:
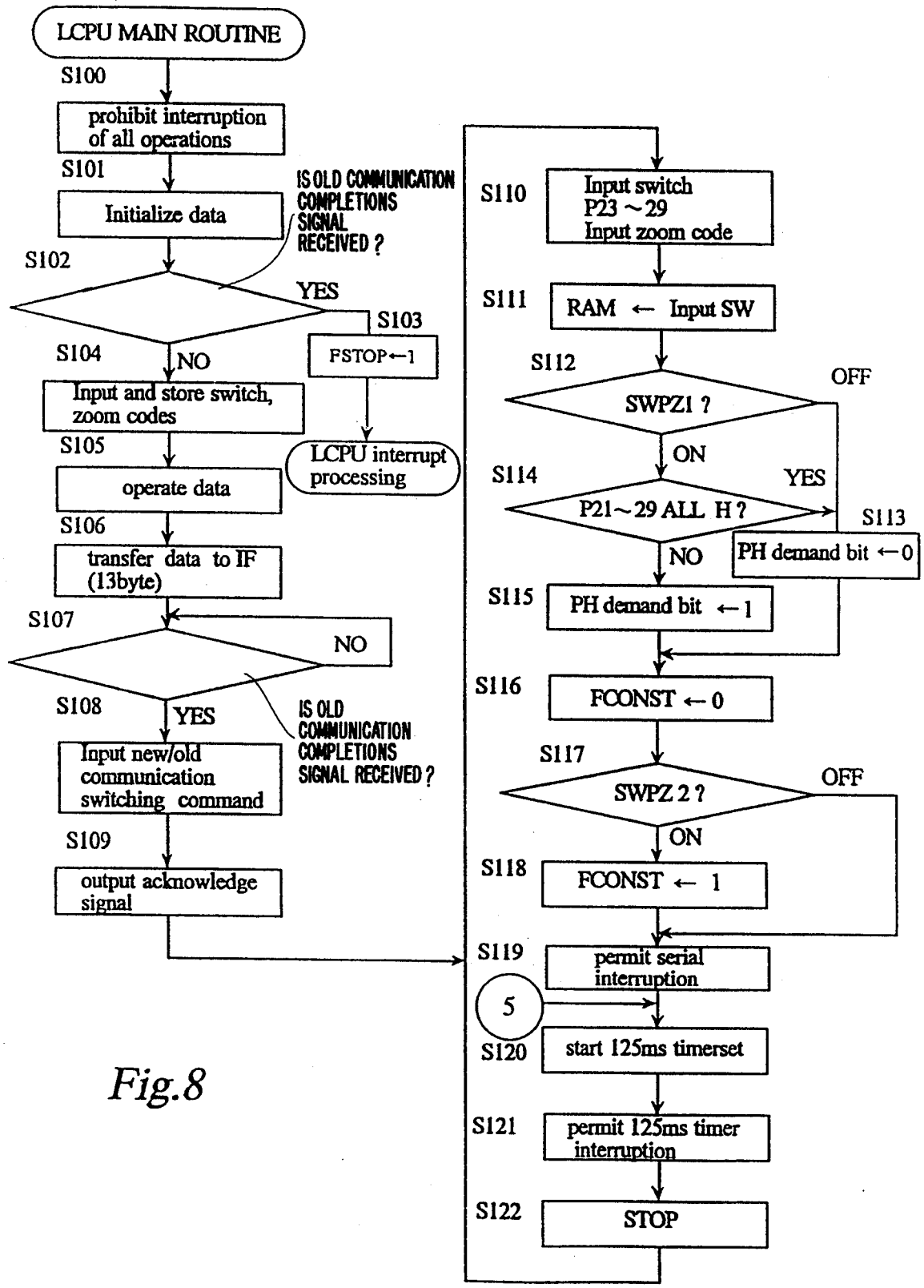
FIG. 8 is a flow chart of the main operation of a lens CPU of a taking lens.

The main operation of the lens CPU 30 will be described below with reference to FIG. 8.

The lens CPU 30 is supplied with power through the contact CONT by the indication CPU 11 and starts when the reset is released after the levels of the contact Cont and the terminal RES are set at "H" and "L", respectively.

The lens CPU 30 performs the initialization after the interruption by all of the operations is prohibited (steps S100 and S101).

After the initialization is completed, whether or not the old communication completion signal is output from the lens interface 41 is checked, that is, whether or not the level of the terminal $\overline{\text{KAFEND}}$ is "L" is checked at step S102. If the old communication completion signal is output, the stop flag FSTOP is set at "1" and then the lens CPU interruption starts (step S103).

Conversely, if the old communication completion signal is not output, which means that the control is still in the old communication, the states of the switches are input and stored in the RAM to successively perform the predetermined arithmetic operations (step S105). During these operations, the initial value data is loaded in the 24 bit shift register 56 in which the data is shifted and serially output to the indication CPU 11.

Every time the predetermined arithmetic operations are finished, the results of the arithmetic operations (arithmetic data) are output to the lens interface 41 (step S106). The arithmetic data output to the lens interface 41 is then loaded in the 24 bit shift register by hardware and successively transferred to the indication CPU 11 through the terminal DATA, as mentioned above.

Upon completion of the output of the arithmetic data to the indication CPU 11, whether or not the old communication completion signal is output is checked at step S107. In this state, the calculated data transferred to the lens interface 41 is transferred to the indication CPU 11. If a rear converter is provided, the data for three bytes is transferred from the rear converter to the indication CPU 11.

When the transfer of the 19 bytes data (including the initial data of three bytes, the calculated data of 13 bytes and the rear converter data of three bytes) is completed, the lens interface 41 outputs the old communication completion signal. Namely, the terminal $\overline{\text{KAFEND}}$ drops to "L".

When the old communication is completion signal is received, the new/old communication switching signal is input from the indication CPU 11 (step S108) and the acknowledgement signal is issued (step S109). This transfers the old communication to a new communication.

In the new communication, the levels of the terminals P23 through P29 are input at step S110 and the states of the switches are memorized in the internal RAM (step S111).

Thereafter, the state of the power zoom switch SWPZ1 is checked to check the power zoom mode or the manual zoom mode at step S112. If the power zoom switch SWPZ1 is turned OFF, the mode is the manual zoom mode so that the power hold demand bit (flag) is set at "0" to stop the supply of power to the PZ motor 34. Thereafter, control proceeds to step S116.

If the power zoom switch SWPZ1 is turned ON, the mode is the power zoom mode, and accordingly, the levels of the terminals P21 through P29 are input to check the states of the switches relating to the zooming operation (step S114). If the levels of all of the terminals P21 through P29 are "H," since no operation for the power zooming is effected, the power hold demand bit is set at "0". Thereafter, the control proceeds to step S116.

If the level of any of the terminals P21 through P29 is "L," since the switch connected to the associated terminal relating to the power zooming is turned ON, the power hold demand bit is set at "1" to supply the PZ motor 34 with power (step S115). Thereafter, control proceeds to step S116.

At step S116, the constant image magnification flag FCONST is set at "0," and then, the control proceeds to step S117. The constant image magnification flag FCONST detects whether or not the constant image magnification mode is set. In the illustrated embodiment, the constant image magnification mode referred to means a mode in which when an object at an object distance D is in focus at a specific focal length f, even if there is a small change ΔD in the object distance, the power zooming is controlled to adjust the focal length f' to thereby satisfy the following relationship;

$$D/f=(D+\Delta D)/f'$$

At step S117, whether or not the power zoom switch SWPZ2 is turned ON is checked. If the power zoom switch SWPZ2 is turned ON, the constant magnification flag FCONST is set at "1," (step S118) and then, the control proceeds to step S119. Conversely, if no power zoom switch SWPZ2 is turned ON, the control directly proceeds to step S119 without setting the constant magnification flag FCONST "1."

After that, at step S119, serial interruption is permitted. Thereafter, the timer operation is set to intermittently perform the routine of steps S110 through S122 (steps S120 and S121) at 125 ms cycle. Thereafter, the operation stops at step S122. The lens CPU 30 performs the operations of steps S110 through S122 for every 125 ms in accordance with the setting of the timer operation.

Serial Interruption of Lens CPU

Figure 9A:
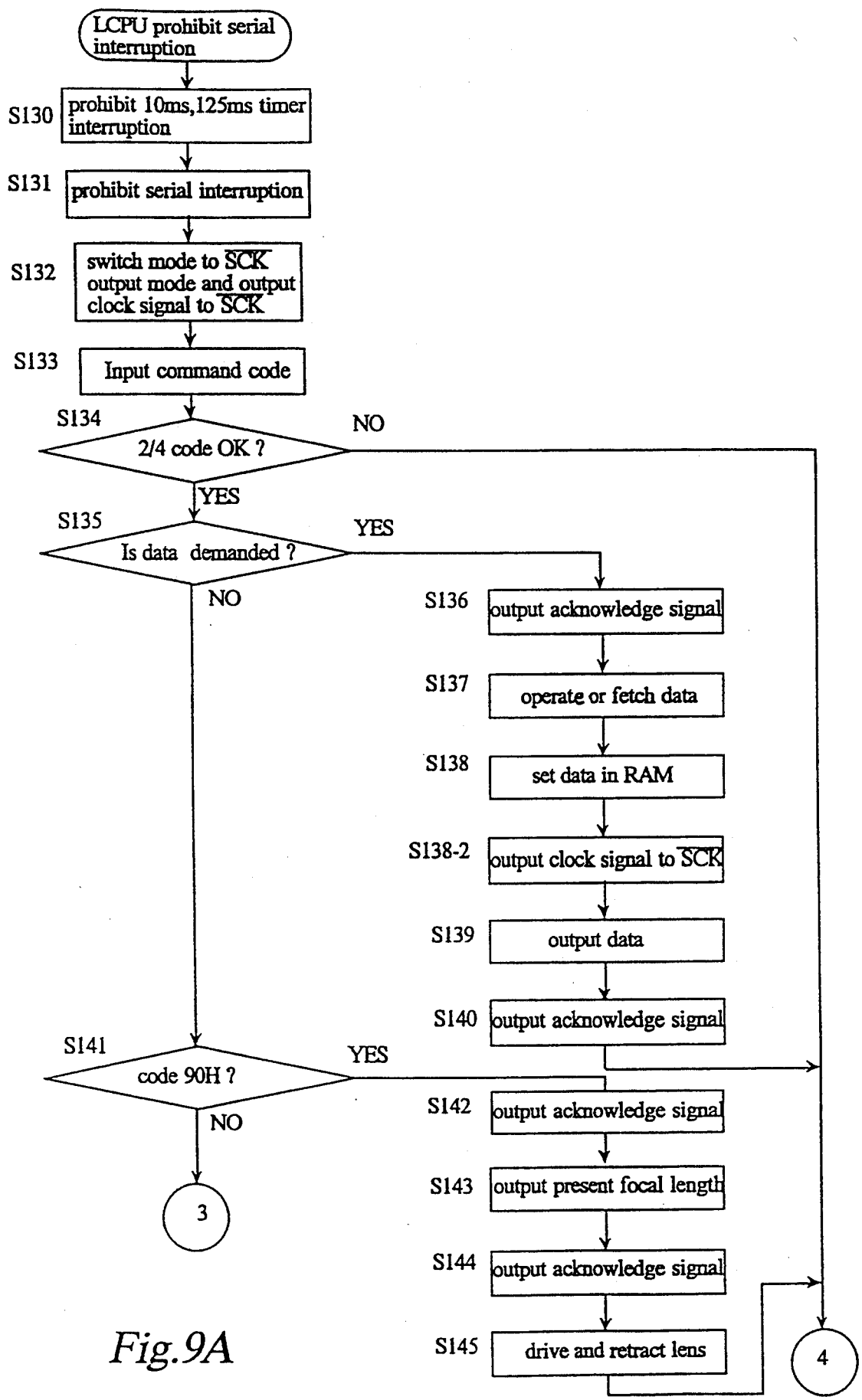
FIGS. 9A, 9B and 9C are flow charts of the data communication of a taking lens; and, FIGS. 10A and 10B are main flow charts of an automatic focusing operation, etc., of a main CPU of a camera body.
Figure 9B:
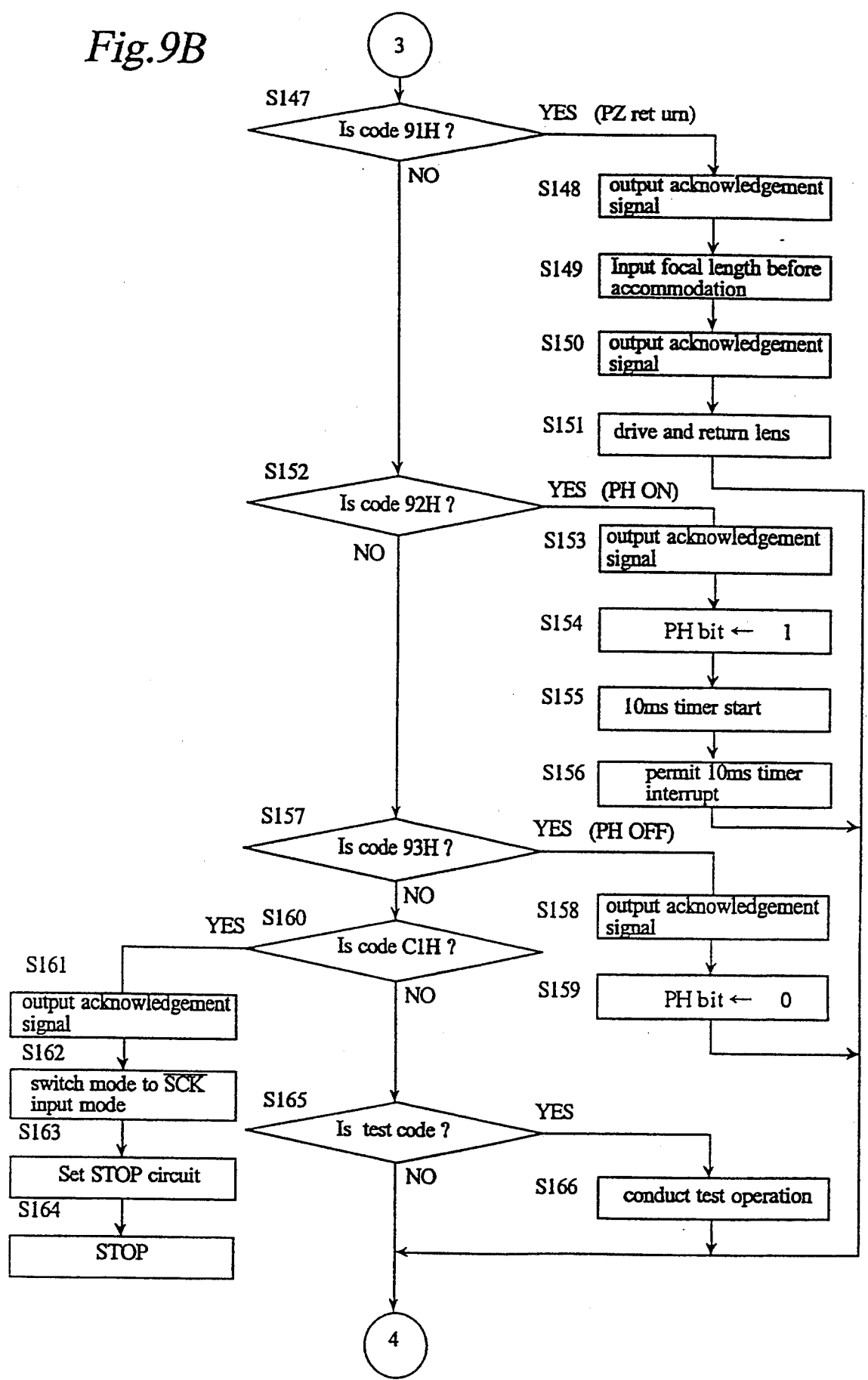
Figure 9C:
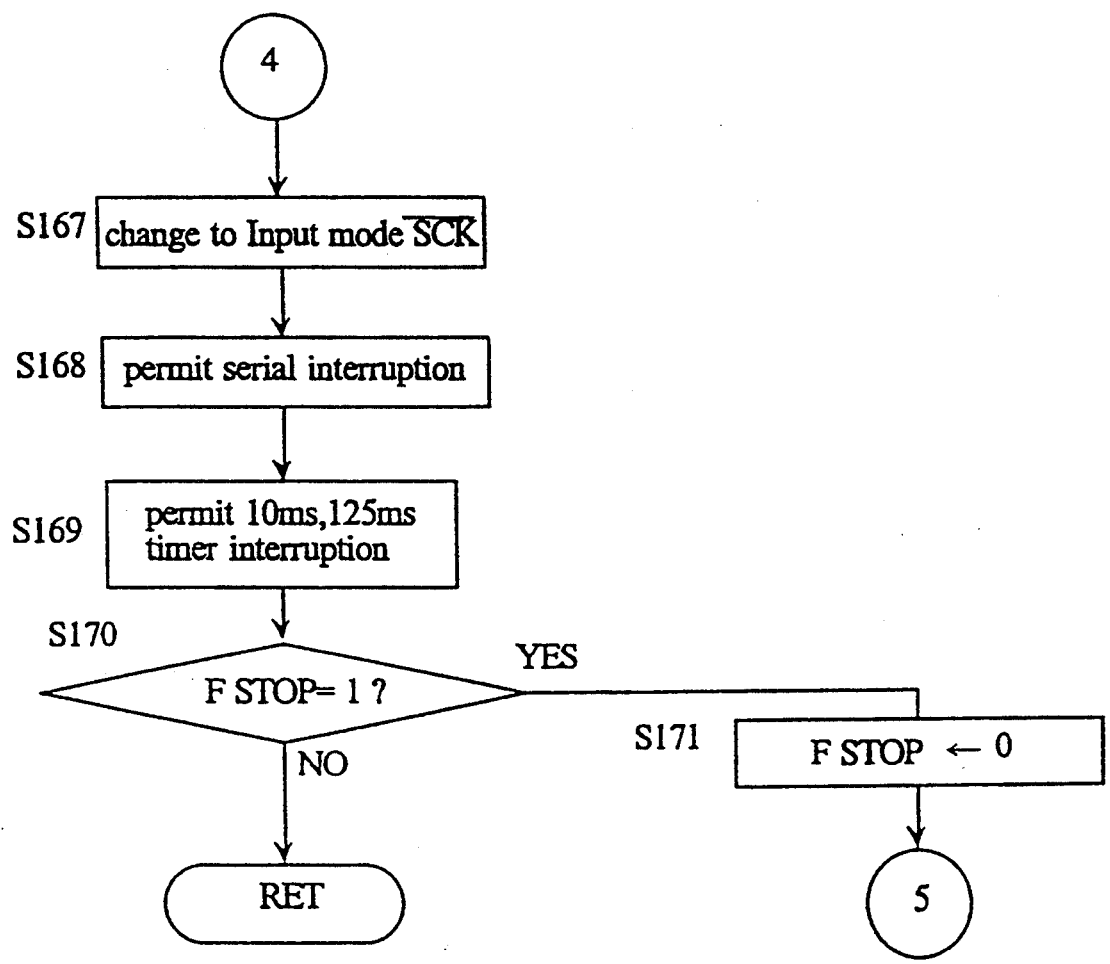
Figure 10A:
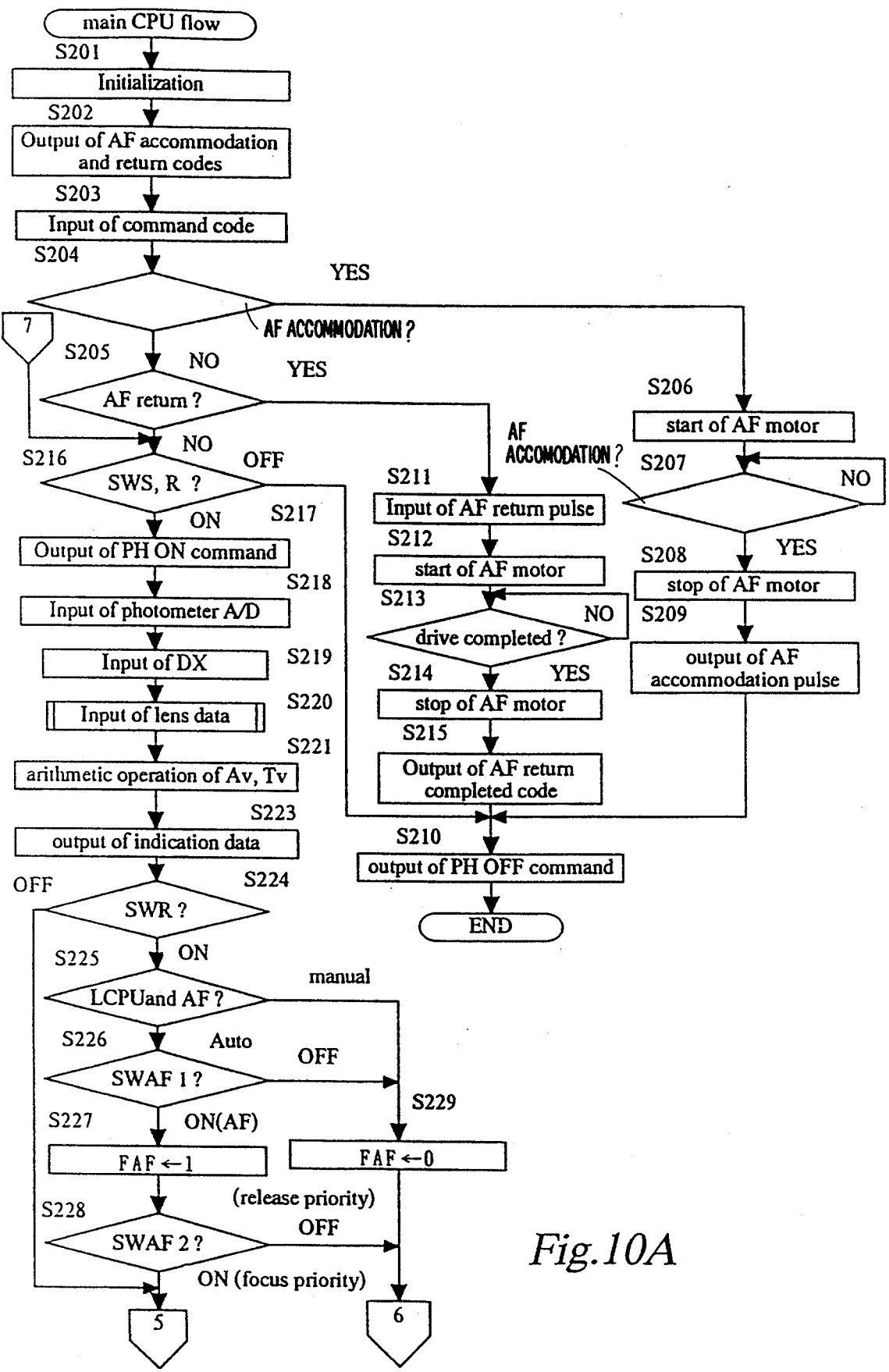
Figure 10B:
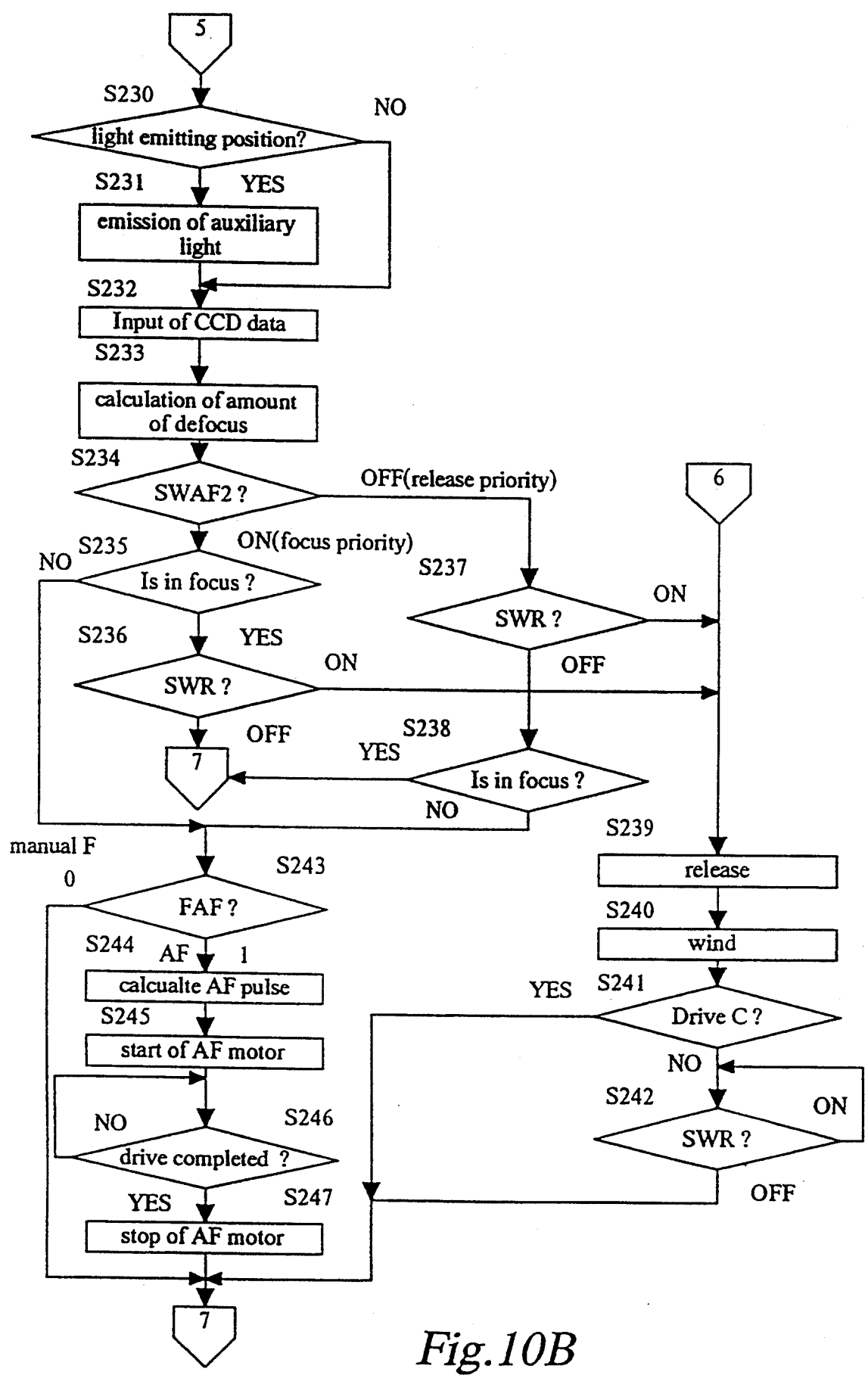

FIGS. 9A through 9C show flow charts for the new communication operation when the serial communication is interrupted by the indication CPU 11 of the camera body 1. When the indication CPU 11 causes the level of the terminal DATA to drop to "L", the lens CPU 30 enters the new communication operation.

First, the lens CPU 30 prohibits the timer interruption by the 10 ms timer and the 125 ms timer and the serial interruption (steps S130 and S131). Note that the 10 ms timer interruption is a power zoom control operation in which when the serial interruption is permitted, the power zooming is controlled at an interval of 10 ms.

Thereafter, the mode is switched to the $\overline{\text{SCK}}$ output mode in which the clock signal is output from the lens CPU 30 to output the serial clock signal to the terminal $\overline{\text{SCK}}$ (step S132). The communication with the camera body 1 is carried out synchronously with the clock signal output from the photographing lens 2.

At step S133, the command code from the indication CPU 11 is input. Thereafter, whether or not the 2/4 code of the command code thus input is correct is checked at step S134. The 2/4 code means the first four bits of the command code, of which two bits are always "H" and the remaining bits (two bits) are always "L."

If these requirements are not satisfied, no operation is performed as an input error of the command code and the control jumps to step S167. At step S167, the mode is switched to the $\overline{\text{SCK}}$ input mode in which the serial clock is input from the camera body side. Thereafter, the 10 ms timer interruption and the 125 ms timer interruption and the serial interruption are permitted (steps S168 and S169). At step S170, if the stop flag FSTOP is "0," the control is directly returned and if the stop flag FSTOP is "1," the control is returned to step S120 of the CPU main routine shown in FIG. 8 after the stop flag FSTOP is set at "0" (step S171).

If the 2/4 code is correct, whether or not the command code is the data demand signal is checked at step S135. If the command code is the data demand signal, the acknowledgement signal is output to calculate the demanded data or to input the data of the code plate and the switches etc., to store the data in the internal RAM (steps S136 through S138).

The stored data is serially output synchronously with the $\overline{\text{SCK}}$ clock signal at step S139. Upon completion of the output of the stored data, the acknowledgement signal is output to complete the data transfer (steps S138-2, S139 and S140). Thereafter, control proceeds to step S167.

If the first four bits are not the command code, whether the latter is code 90H, 91H, 92H, 93H, the sleep code or the test code is checked (steps S141 through S147, step S152, step S157, step S160 and step S165).

If the command code is the code 90H (lens accommodation), the acknowledgement signal is sent to the indication CPU 11 (step S142). Thereafter, the present focal length data is sent from the zoom code plate 37 to the indication CPU 11 (step S143). Upon completion of the feed of the focal length data to the indication CPU 11, the acknowledgement signal is output to accommodate or retract the photographing lens (steps S144 and S145). Thereafter, control proceeds to step S167.

If the command code is the code 91H (lens return), the receipt acknowledgement signal is sent to the indication CPU 11 (step S148). Thereafter, the focal length data before accommodation is input from the indication CPU 11 (steps S149). Upon completion of the input of the focal length data before accommodation, the acknowledgement signal is output to finish the input of the focal length data before accommodation (step S150). Thereafter, the PZ motor 34 is driven to set the focal length to be the focal length before accommodation at step S151. Thereafter, the control proceeds to step S167.

If the command code is the code 92H (power hold ON), the receipt acknowledgement signal is output at step S153. Thereafter, the power hold demand bit PHbit is set at "1" (step S154), and the 10 ms timer begins permitting the 10 ms timer interruption (steps S155 and S156). Thereafter, control proceeds to step S167.

If the command code is the code 93H (power hold OFF), the acknowledgement signal is output (steps S157 and S158), and the power hold bit is reset to "0" (step S159). Thereafter, the control proceeds to step S167.

If the command code is none of the codes 90H, 91H, 92H and 93H, whether or not the command code is the sleep code C1H is checked at step S160. If the command code is the sleep code C1H, the receipt acknowledgement signal is output to change the mode to the $\overline{SCK}$ input mode in which the level of the terminal $\overline{CE}$ drops to "L" (steps S161 and S162). Consequently, the control stops. Note that the "sleep" referred to herein means that control does not proceed.

The lens CPU 30, which sleeps, is driven by the indication CPU 11 or the zoom switch SWAP3, SWPZ1 or SWPZ2, etc. Namely, for instance, if the clock signal is input to the terminal from the indication CPU 11 and the terminal DATA drops to "L", the lens CPU 30 is reset. If the data is input to the terminal DATA, the lens CPU 30 switches the mode to the $\overline{SCK}$ terminal output mode so that the LCPU interruption routine can be carried out. When the zoom switch SWPZ1 or SWPZ2 is turned ON, the power zoom motor 34 is driven to control the power zooming.

If the command code is not the sleep code C1H, whether or not the command code is the test code FXH is checked at step S165. If the command code is the test code FXH, the test operation is performed at step S166, and then, the control proceeds to step S167. If the command code is not the test code FXH, the control skips step S166 to step S167. The test mode is not used while taking a picture, but instead is used to effect a predetermined data communication without mounting the photographing lens to the camera body, for example upon assembly of the lens or adjustment thereafter, etc.

At step S167, the mode is changed to the $\overline{SCK}$ input mode in which the clock signal can be received from the indication CPU 11. Thereafter, the serial interruption, the 10 ms timer interruption and the 125 ms timer interruption are permitted (steps S168 and S169).

Thereafter, at step S170, whether or not the stop flag FSTOP is "1" is checked. If FSTOP is "1," it is reset to "0" (step S171). The control is returned to step S120 of the main routine of the lens CPU. Conversely, if FSTOP is "0" at step S170, the control is directly returned.

Main Routine of Main CPU

The main operation of the main CPU 10 is carried out in accordance with the program stored in the internal ROM thereof.

The main CPU 10 starts when the indication CPU 11 causes the terminal P1 to become "H" so that the DC/DC converter 25 is turned ON to supply the main CPU 10 with the power.

The main CPU 10 performs the initialization of the internal RAM and the ports P, etc., and then outputs the AF return code to the indication CPU 11 and receives the command code from the indication CPU 11 (steps S201 through S203).

If the command code is data on the AF accommodation, the AF motor 19 is driven to retract the zoom lens 2 and outputs the AF retraction pulses to the indication CPU (steps S206 through S209).

If the command code is data on the AF return, the AF return pulses are received from the indication CPU 11 so that the AF motor 19 is driven in accordance with the number of AF return pulses to return the focal point to a position before the retraction (steps S205, S211 through S215). Thereafter, the power hold OFF command (code 93H, PH OFF) is output to stop the power supply to the indication CPU 11 (step S210).

If the control enters the main routine of the main CPU 10 by not turning the lock switch SWL OFF or ON, the control is neither the AF accommodation nor the AF return. In this case, if both the photometer switch SWS and the release switch SWR are not turned ON, the power supply to the indication CPU 11 is stopped (steps S204, S205, S216 and S210).

When the lock switch SWL is turned ON and the photometer switch SWR or the release switch SWR is turned ON, the following operation is carried out.

The power hold ON command (PH ON) is output from the indication CPU 11 to maintain the power supply thereto, the object luminance data By and the DX code of the film sensitivity Sv are input, and thereafter the lens data is input from the indication CPU 11 (steps S216 through S220). The lens data includes the IRC data.

The optimum exposure factors (shutter speed Tv and the diaphragm value Av) are calculated in accordance with the input data. The calculated optimum exposure factors TV, Av and the film sensitivity Sv are transferred to the indication CPU 11 which indicates this data in the LCD panel 12.

If the release switch SWR is turned ON, the exposure (release) is effected in accordance with the optimum exposure factors and the film winding is effected, provided that the manual lens is attached to the camera body, the manual focus mode is selected even if the AF lens is attached, or the release priority mode is selected when the AF lens is attached (steps S224, S225, S229, S239 and S240, or steps S224 through S226, S229, S239 and S240, or steps S224 through 228, S239 and S240).

If the mode is the continuous shot mode, the control is directly returned to step S216. If the mode is the single shot mode, the control is returned to step S216 after the release switch SWR is turned OFF (steps S241, S216, or steps S241, S242 and S216).

If the release switch SWR is not turned ON, or even if the release switch SWR is turned ON, when the lens is the AF lens and when the auto focus mode and the focus priority mode are selected, the auxiliary light emitting element 44 emits auxiliary infrared light, provided that the strobe light emitting unit 45 is in the light emitting position, so that the CCD data by the auxiliary light is input from the CCD object distance measuring sensor 17 to calculate the amount of defocus using the IRC data (steps S224 through S233, or steps S224, S230 through S233).

If the mode is the release priority mode, the release operation, etc., are performed when the release switch SWR is turned ON (steps S234, S237 through S241 and S216).

If the object is "in focus" in the focus priority mode (i.e., the amount of defocus is zero), the release operation and the film winding operation are performed when the release switch SWR is turned ON (steps S234 through S236, S239 through S242 and S216).

When the object is "out of focus" in the focus priority mode (i.e., the amount of defocus is not zero), or when the release switch SWR is turned OFF and the object is out of focus in the release priority mode, the number of AF pulses is calculated in accordance with the amount of defocus and the K value data so that the AF motor 19 is driven in accordance with the calculated number of AF pulses to move the focusing lens toward the focal position (steps S234 S235, S243 through S247 and S216, or steps S234, S237 2S38, S243 through S247 and S216).

When the release switch SWR is turned OFF and the object is in focus in the release priority mode, or when the object is out of focus in the manual focus mode and the focus priority mode, or when the release switch SWR is turned OFF in the release priority mode and the manual focus mode, no operation is performed and the control is returned to step S216 (steps S234, S237, S238, or steps S234, S235, S243, S216, or steps S234, S237, S238, S243 and S216).

As can be understood from the foregoing, according to the present invention, when the auxiliary light emitting element 44 emits the auxiliary light, since the main CPU 10 calculates the amount of defocus using the IRC data calculated by the lens CPU 30 based on the auxiliary light, a precise focusing can be effected. Although the IRC data can be input from the zoom lens 2 only when the auxiliary light is emitted, it is also possible to input the IRC data regardless of the emission of the auxiliary light, on the assumption that the data, when no auxiliary light is emitted, is "0".

Furthermore, according to the present invention, since the lens CPU 30 has only an algorithm for calculating the IRC data so that the IRC data of focal length, for example, is calculated based on predetermined equations and the detected present focal length data, the data stored in the lens ROM 30A can be reduced.

In addition to the foregoing, according to the present invention, since only the steady data is stored in the lens ROM 30A and other data is calculated, it is not necessary to employ the page memory system in which all data, such as correction data, corresponding to all focal lengths is stored, the memory capacity of the lens ROM can be considerably reduced.

Alternatively, it is possible to provide the auxiliary light emitting element 44 on the camera body. Also, it is possible to automatically emit auxiliary light in accordance with the object luminance or the contrast of the object to be taken, etc.

The object distance is ignored when calculating the IRC data in the above mentioned embodiment of the present invention. However, if the object distance is very small (the object is very close to the camera), the IRC data largely depends on the object distance, and accordingly, the object distance should be considered one of the parameters.

As can be seen from the above discussion, according to the present invention, since the focus is adjusted using the correction data which is calculated by the control means of the taking lens when the auxiliary light is emitted, the focusing operation can be accurately effected even when the auxiliary light is emitted. In addition, since the correction data is calculated by the control means of the taking lens, the load on the control means of the camera body can be reduced and the operation time can be reduced.

We claim:

1. An automatic focusing camera comprising a camera body and a photographing lens detachably mounted to the camera body, wherein:
    said camera body comprises a focus detecting means which outputs a focus signal in accordance with an image formed by a photographing lens, an auxiliary light emitting means for emitting auxiliary light for detecting a focus, and an arithmetic operating means for calculating focusing data in accordance with the focus signal output from said focus detecting means;
    said photographing lens comprises memory means for storing predetermined lens data, means for outputting the predetermined lens data to said camera body, and control means for calculating focus correction data for correcting the predetermined lens data, in accordance with the auxiliary light when said auxiliary light emitting means emits auxiliary light;
    wherein said memory means stores said focus correction data when auxiliary light is emitted from said auxiliary light emitting means; and,
    said arithmetic operating means of said camera body calculates focusing condition data in accordance with the focus signal outputted by said focus detecting means and the focus correction data input from said photographing lens.

2. An automatic focusing camera according to claim 1, wherein said focus detecting means comprises a phase difference detection type of CCD object distance measuring sensor.

3. An automatic focusing camera according to claim 1, wherein said photographing lens comprises a focusing lens and said camera body comprises an AF driving means for driving said focusing lens.

4. An automatic focusing camera according to claim 3, wherein said arithmetic operating means of said camera body calculates a displacement of the AF driving means necessary to move said focusing lens to a focal position.

5. An automatic focusing camera according to claim 4, wherein said camera body comprises control means for driving said AF driving means in accordance with the displacement calculated by said arithmetic operating means.

6. An automatic focusing camera according to claim 5, wherein said arithmetic operating means of said camera body calculates the displacement of said AF driving means in accordance with the focus signal and said focus correction data when said auxiliary light emitting means emits auxiliary light.

7. An automatic focusing camera according to claim 6, wherein said arithmetic operating means of said camera body calculates an amount of defocus in accordance with the focus signal of said focus detecting means.

8. An automatic focusing camera according to claim 7, wherein said arithmetic operating means of said camera body calculates the displacement of said focusing lens of said photographing lens to make the amount of defocus zero.

9. An automatic focusing camera according to claim 1, wherein said camera body and said photographing lens comprise inputting and outputting means for transmitting and receiving said focus correction data.

10. An automatic focusing camera according to claim 9, wherein said photographing lens comprises a clock output means so that transfer and receipt of said focus correction data are effected synchronously with a clock signal of said clock output means.

11. An automatic focusing camera according to claim 1, wherein said photographing lens is a zoom lens.

12. An automatic focusing camera according to claim 11, wherein said zoom lens comprises a focal length detecting means so that said control means of said photographing lens calculates said focus correction data corresponding to a focal length detected by said focal length detecting means.

13. An automatic focusing camera according to claim 12, wherein said memory means of said zoom lens stores therein a predetermined algorithm for calculating the correction data which varies in accordance with the focal length.

14. An automatic focusing camera according to claim 13, wherein said control means calculates said focus correction data corresponding to the focal length in accordance with said predetermined algorithm and outputs said focus correction data through said outputting means.

15. An automatic focusing camera according to claim 14, wherein said memory means of said zoom lens stores therein a plurality of algorithms corresponding to characteristics of said zoom lens to be mounted to said camera body.

16. An automatic focusing camera according to claim 15, wherein said control means calculates said focus correction data corresponding to the focal length in accordance with an algorithm from said plurality of algorithms corresponding to the lens characteristics.

17. An automatic focusing camera according to claim 16, wherein said focus correction data includes data for correcting a deviation of a position of an image formed by a reference light from a position of an image formed by the auxiliary light.

18. An automatic focusing camera according to claim 17, wherein said camera body comprises a strobe means having a light emitting portion movable between a retracted position and a light emitting position.

19. An automatic focusing camera according to claim 18, wherein said auxiliary light emitting means is provided on the light emitting portion and emits auxiliary light when the light emitting portion is in the light emitting position.

20. An automatic focusing camera according to claim 2, wherein said arithmetic operating means of the camera body calculates an amount of defocus in accordance with data detected by the CCD object distance measuring sensor.

21. An automatic focusing camera according to claim 20, wherein said arithmetic operating means of said camera body calculates data necessary for moving said focusing lens of said photographing lens to a position in which the amount of defocus is zero.

22. An automatic focusing camera according to claim 1, wherein said control means calculates said focus correction data in accordance with a predetermined arithmetic formula.

23. An automatic focusing camera according to claim 22, wherein said predetermined arithmetic formula includes a focal length as a parameter.

24. An automatic focusing camera according to claim 23, wherein said predetermined arithmetic formula is determined in accordance with the focal length.

25. A photographing lens detachably attached to a camera body, said camera body including a focus detecting means which outputs a focus signal in accordance with an image formed by a taking lens, an auxiliary light emitting means for emitting auxiliary light for detecting a focus, and an arithmetic operating means for calculating focus data in accordance with the focus signal output from the focus detecting means, wherein said photographing lens comprises:

a memory means for storing predetermined lens data; and, an outputting means for outputting the predetermined lens data to the camera body; and, control means for calculating focus correction data for correcting the predetermined lens data, in accordance with the auxiliary light when said auxiliary light emitting means emits auxiliary light;

said memory means storing said focus correction data when auxiliary light is emitted from said auxiliary light emitting means.

* * * * *